United States Patent [19]
Capps

[11] Patent Number: 5,634,100
[45] Date of Patent: May 27, 1997

[54] SYSTEM AND METHOD FOR EVENT PARAMETER INTERDEPENDENCE AND ADJUSTMENT WITH PEN INPUT

[75] Inventor: Stephen P. Capps, San Carlos, Calif.

[73] Assignee: Apple Computer, Inc., Cupertino, Calif.

[21] Appl. No.: 512,523

[22] Filed: Aug. 7, 1995

[51] Int. Cl.$^6$ .................................................. G06F 15/00
[52] U.S. Cl. .......................... 395/209; 395/963; 395/340
[58] Field of Search .................................. 395/155–161, 395/154; 364/401 R–402, 407; 368/41; 345/117–120, 145–146, 173

[56] References Cited

U.S. PATENT DOCUMENTS

| | | | |
|---|---|---|---|
| 4,937,743 | 6/1990 | Rassman et al. | 364/401 R |
| 5,220,540 | 6/1993 | Nishida et al. | 368/41 |
| 5,247,438 | 9/1993 | Subas et al. | 364/401 R |
| 5,307,086 | 4/1994 | Griffin et al. | 395/155 X |
| 5,323,314 | 6/1994 | Baber et al. | 364/401 R |
| 5,365,360 | 11/1994 | Torres | 395/159 |
| 5,491,495 | 2/1996 | Ward et al. | 345/173 |
| 5,500,938 | 3/1996 | Cahill et al. | 395/161 |
| 5,519,606 | 5/1996 | Frid-Nielsen et al. | 364/401 R |
| 5,528,745 | 6/1996 | King et al. | 395/161 |
| 5,570,109 | 10/1996 | Jenson | 345/146 |

*Primary Examiner*—Mark R. Powell
*Assistant Examiner*—John E. Breene
*Attorney, Agent, or Firm*—Hickman Beyer & Weaver

[57] ABSTRACT

The present invention teaches a variety of event bounds adjustment methods and systems. The bounds of the event are defined by event parameters including an event start boundary, an event stop boundary, and an event duration, wherein the event start boundary and the event stop boundary may be tied to one another such that an event parameter interdependence exists. One method includes the steps of displaying an event adjustment window showing the event start boundary, the event stop boundary, and the event duration, receiving an event adjustment input explicitly intended to modify a selected event parameter being a one of the event start boundary, the event stop boundary, and the event duration, whereby each non-selected event parameter may be implicitly intended to be modified, modifying the selected event parameter in accordance with the event adjustment input, modifying each non-selected parameter in accordance with the event parameter interdependence, and displaying the event adjustment window showing the event start boundary, the event stop boundary, and the event duration as modified. In another embodiment, a pen-based computer implemented system for performing the above steps is disclosed. In still another embodiment, a computer readable medium contains a computer program for adjusting the bounds of an event. In addition, the present invention teaches a graphical user interface having a pen-based. Implemented within the pen-based computer system are an event scheduler display window, an event slip corresponding to the identified event, a time picker event adjustment window, and a date picker event adjustment window.

20 Claims, 16 Drawing Sheets

SYSTEM AND METHOD FOR EVENT PARAMETER INTERDEPENDENCE AND ADJUSTMENT WITH PEN INPUT

BACKGROUND OF THE INVENTION

The present invention relates generally to computer systems, and more particularly to an event bounds adjustment system and method for pen-based computer systems.

Computers are becoming increasingly powerful, lightweight, and portable. The computing power of computers that once filled entire rooms is now residing on a desktop. Laptop, notebook, and sub-notebook computers are virtually as powerful as their desktop counterparts. Even smaller hand-held computers are now capable of computing tasks that required a much larger machine a few short years ago.

As a part of this trend, computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from many companies including Sharp and Casio of Japan.

A relatively new form of computer, the pen-based computer system, holds forth the promise of a marriage of the power of a general purpose computer with the functionality and small size of a personal organizer. An example of a pen-based computer system is the Newton® 120 pen-based computer made and marketed by Apple Computer, Inc. of Cupertino, Calif.

A pen-based computer system is typically a small, hand-held computer where the primary method for inputting data includes a "pen" or stylus. A pen-based computer system is commonly housed in a generally rectangular enclosure, and is provided with a dual-function display assembly that can serve as both an input device and an output device. When operating as an input device or "tablet", the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad, among other functions. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. By "ink" it is meant that pixels on the screen are activated in such a manner that it appears that the stylus is leaving a trail of ink on the display assembly. With suitable recognition software, the "ink" can be recognized to input text, numerics, graphics, and other recognized information into the pen-based system.

Ideally, recognition software accurately recognizes the input text, numerics, graphics, and other information entered into the pen-based system. However, while constantly improving, current recognition software has yet to reach a level of sophistication and accuracy which allows data to be entered consistently without errors through a user scribbling (stylus entry) onto the surface of a display screen.

Take a common example involving the entry of date and/or time information. An sample date entry may consist of the user scribbling a specific character string "1/1/96" onto the dual-function display screen. In attempting to recognize this string, the recognition software must not only differentiate between the graphically similar (i.e. the characters have similar stroke characteristics) characters "1" and "/" which are contained in the specific string, but also between other similar characters such as "l", "7", "!", each of which may have a number of possible variations based on the user's handwriting style.

One reasonable attempt to optimize the performance of recognition software utilizes input fields designed for information of a predefined nature. The input field design may provide a formatted input field and/or limit the characters which the input field will accept. In the above numeric date entry example, the recognition software in conjunction with an appropriate input field will automatically eliminate characters such as "l" and "!" which are not allowable for numeric date entry. This will improve a given recognition software's accuracy, yet does not completely solve the problem.

Another approach provides the user a keyboard image which enables entry of the appropriate characters. While guaranteeing accuracy, utilizing the keyboard image with a stylus is a clumsy and time consuming method for data entry.

One of the most common usages of computerized personal organizers is the scheduling of events (meetings, appointments, to-do items, deadlines, scheduled phone calls, reoccurring meetings, etc.) on the user's computerized calendar. Typically these events have bounds which are defined by a variety of event parameters such as start time, stop time, start date, stop date, event duration(stop time minus start time), and reoccurrence duration (roughly stop date minus start date). Accordingly, it is particularly important that developers of computerized personal organizers provide a data entry system and method which allows these event parameters to be conveniently yet accurately entered.

In addition to the base requirement of providing accurate information to the computer system, whatever data entry system and method is chosen must satisfy the natural requirements of pen-based personal organizers. For example, as will be appreciated by those skilled in the art, an ongoing challenge in the field of computerized personal organizers is providing a suitable mechanism for entering meaningful input through what are relatively small display screens.

SUMMARY OF THE INVENTION

In accordance with the objectives of the present invention, a variety of event bounds adjustment methods and systems are disclosed. In accordance with one aspect of the present invention, a method for adjusting a bounds of an event is disclosed. The bounds of the event are defined by event parameters including an event start boundary, an event stop boundary, and an event duration, wherein the event start boundary and the event stop boundary may be tied to one another such that an event parameter interdependence exists. The method comprises the computer controlled steps of displaying an event adjustment window showing the event start boundary, the event stop boundary, and the event duration, receiving an event adjustment input explicitly intended to modify a selected event parameter being a one of the event start boundary, the event stop boundary, and the event duration, whereby each non-selected event parameter may be implicitly intended to be modified, modifying the selected event parameter in accordance with the event adjustment input, modifying each non-selected parameter in accordance with the event parameter interdependence, and displaying the event adjustment window showing the event start boundary, the event stop boundary, and the event duration as modified. Additionally, a pen-based computer implemented system for performing the above steps is disclosed.

According to a separate aspect of the present invention, a computer readable medium contains a computer program for adjusting a bounds of an event, the bounds of the event defined by event parameters including an event start boundary, an event stop boundary, and an event duration, wherein the event start boundary and the event stop boundary may be tied to one another such that an event parameter interdependence exists. In one embodiment, the computer program contains program instructions for performing the steps of the method of the preceding paragraph.

In another embodiment, a graphical user interface is disclosed. The graphical user interface comprises a pen-based computer system including a central processing unit, a memory accessible by the central processing unit, and a dual-function display system having a display screen and a pen for use in entering data into the pen-based computer system via the dual-function display system.

Implemented within the pen-based computer system are an event scheduler display window, an event slip corresponding to the identified event, a time picker event adjustment window, and a date picker event adjustment window. The event scheduler display window has a multiple hour time block, a calendar, and an identified event. The event slip corresponds to the identified event and includes a title field, a time field having an event start time and an event stop date, and a date field having an event start date and an event stop date. The time picker event adjustment window has descriptive labels identifying both the event start time and the event stop time, and a close request button operable to close the time picker event adjustment window. The date picker event adjustment window has descriptive labels identifying the event start date and the event stop date, and a close request button operable to close the date picker event adjustment window.

These and other advantages of the present invention will become apparent upon reading the following detailed descriptions and studying the various figures of the drawings.

BRIEF DESCRIPTION OF THE DRAWINGS

FIG. 15 is a computer screen display showing a date picker event adjustment window in accordance with one embodiment of the present invention;

FIG. 17 is a computer screen display showing an adjustment to an event start date in accordance with the method of FIG. 16;

FIG. 19 is a computer screen display showing an adjustment to an event stop date in accordance with the method of FIG. 18;

FIG. 21 is a computer screen display showing an event duration pop-up menu in accordance with still another embodiment of the present invention.

DETAILED DESCRIPTION OF THE PREFERRED EMBODIMENTS

The present invention is well suited for pointer based computer systems such as the pen-based, pen-aware, mouse, track ball, and track pad controlled systems that are currently popular. For the purposes of illustration, the invention will be described in connection with a pen-based system.

Figure 1:
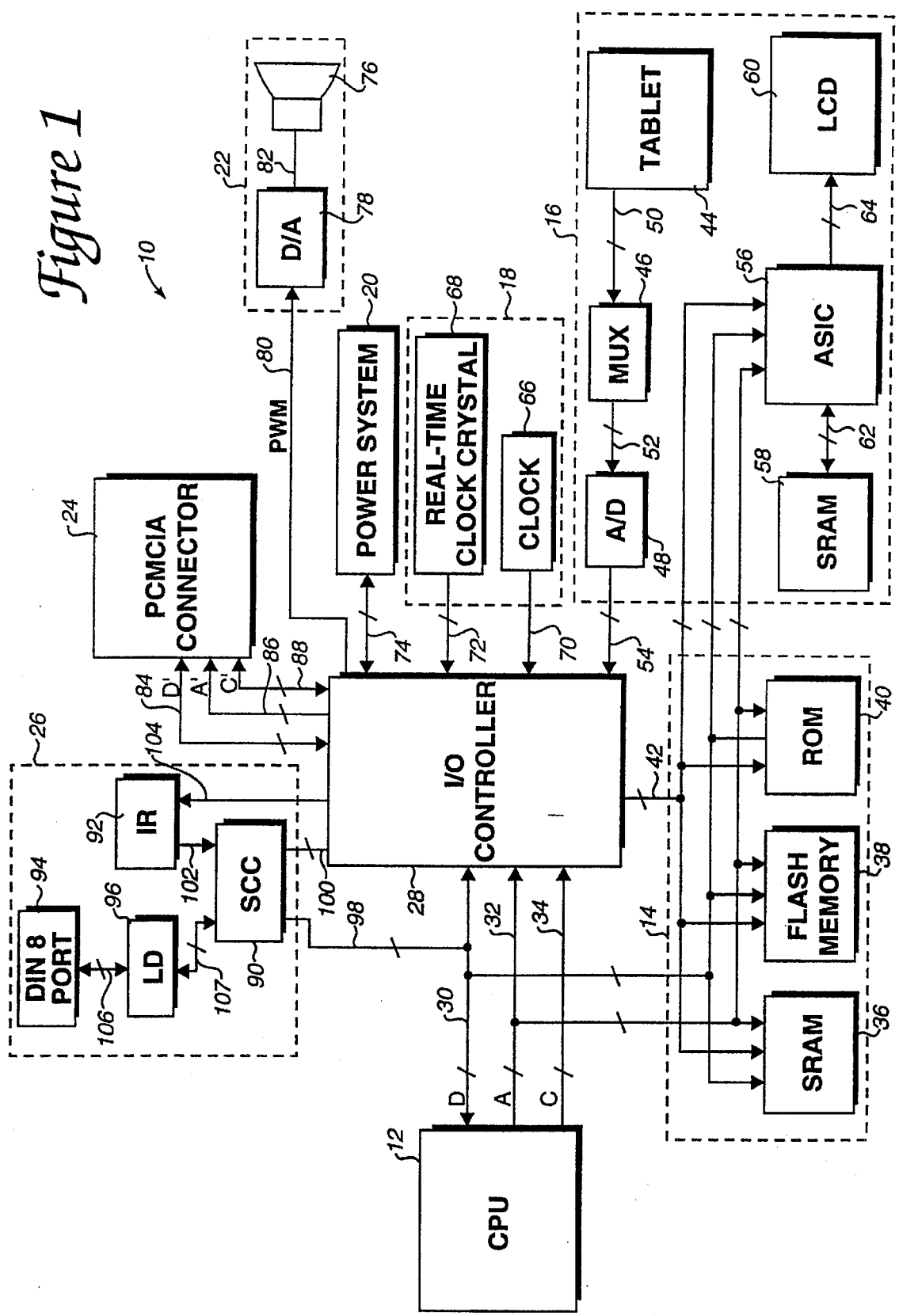
FIG. 1 is a block diagram of the electronics of a pen-based computer system in accordance with the present invention.

As shown in FIG. 1, a block diagram 10 of the electronics of a pen-based computer in accordance with the present invention includes a central processing unit (CPU) 12, a memory system 14, an input/output (I/O) dual function display system 16, a clock system 18, a power system 20, a sound system 22, a PCMCIA connector 24, and a serial I/O system 26. The various components and systems of the computer 10 are coupled together by an I/O controller 28 which serves as an interface between the CPU 12 and other components of the computer 10. More specifically, the I/O controller 28 is an application-specific integrated circuit (ASIC) designed to handle memory, peripherals, and I/O tasks, as well as housekeeping functions such as providing system clocks, controlling power usage, etc. The design, manufacture, and use of ASICs is well known to those skilled in the art. The pen-based computer 10 as illustrated is currently being manufactured and sold by Apple Computer, Inc. of Cupertino, Calif. as a Newton® 120 Personal Digital Assistant (PDA).

CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. In the present embodiment, the CPU 12 is preferably an ARM® 610 RISC chip operating at 20 megahertz and is available from a variety of sources including VLSI Technology, Inc. of San Jose, Calif. and Plessey Semiconductor of England. The present CPU 12 includes a 32 bit data (D) bus 30, a 32 bit address (A) bus 32, and an 8 bit control (C) bus 34.

The memory system 14 includes static random access memory (SRAM) 36, non-volatile read/write "flash" memory 38, and ROM 40. The SRAM 36 serves as volatile "scratch pad" memory for the computer system 10 and, in the current system, includes 512 kilobytes of memory. The flash memory 38 is where user data is stored, preferably includes about 2 megabytes of memory, and is available as a standard product from Intel Corporation of Santa Clara, California. The ROM 40 stores the operating system and embedded application programs, and currently comprises approximately 8 megabytes of memory. Of course, there are many equivalents for the SRAM 36, flash memory 38, and ROM 40. For example, dynamic random access memory (DRAM) can be substituted for SRAM 36, battery-backed random accessed memory (RAM) can be substituted for flash memory 38, and a programmable read-only memory (PROM) can be substituted for the ROM 40.

The memory system 14 is coupled directly to the data (D) bus 30 and the address (A) bus 32. The memory system is also coupled to a memory control bus 42 of controller 28. The CPU 12 and controller 28 cooperate to read and write data to the memory system 14 via the busses 30, 32, and 42.

The I/O display system 16 serves as both an input device and an output device. More particularly, a tablet 44, multiplexer (MUX) 46, and analog-to-digital (A/D) converter 48 convert the contact of a stylus (see FIG. 2) with the tablet 44 and its subsequent movement over the tablet into digital data that is input to controller 28. The tablet 44 is preferably a four-wire resistive membrane tablet and provides positional information on a bus 50 which is input into the MUX 46. The MUX 46 determines which of the four sides of the tablet is to be read. Such tablets are widely available from a variety of sources including Nissha of Japan. An output from the MUX 46 is input to A/D converter 48 on a bus 52. An output from the A/D converter 48 is input into the controller 28.

The display system 16 further includes an ASIC 56, a dedicated SRAM 58, and an LCD screen 60. The ASIC 56 is an LCD controller coupled to the data (D) bus 30, the address (A) bus 32, and the memory control bus 42. The purpose of the ASIC 56 is to allow the CPU 12 to write to the screen as if it were a RAM sitting on the memory bus 42. The SRAM 58 is coupled to the ASIC 56 by a dedicated bus 62, and the screen 60 is coupled to the ASIC 56 by a dedicated bus 64. The ASIC 56 serves as a controller for the screen 60, and uses the SRAM 58 as a frame buffer to store images to be displayed on the screen 60. The LCD screen 60 is preferably a standard super-twist LCD matrix screen available from a number of sources including Seiko-Epson of Japan. The LCD screen preferably comprises a rectangular array of picture elements or "pixels", as is well known to those skilled in the art.

The clock system 18 includes a main system clock 66 and a real-time clock (RTC) crystal 68. The main system clock is a four-terminal oscillator and is used to provide the master clock for the computer 10. In the present embodiment, the main system clock 66 operates at 40 megahertz. Oscillator clocks such as clock 66 can be commercially obtained from many sources including Seiko-Epson of Japan. This master clock may be divided down by the controller 28 for various timing purposes in the system, and is coupled to the controller 28 by a line 70.

The RTC crystal 68 is tuned to 32.768 kilohertz, which is evenly divisible by a power of 2. The RTC crystal 68 forms the basis of a crystal based oscillator that can provide a continuous, precise, uninterrupted signal at 1 hertz by dividing down the 32.768 kilohertz crystal signal with a 10 bit divider. The circuitry for performing this type of task is well-known, and form a part of controller 28 in this embodiment. The one hertz RTC signal increments a RTC counter (also a part of the controller 28) to count off the total number of seconds that has elapsed since midnight, Jan. 1, 1904. The value in the RTC counter can be converted into time of day and date information by relatively straight-forward calculations well known to those skilled in the art. Since the RTC crystal 68 is coupled to the controller 28 by a dedicated two-line bus 72 to provide the 32.768 kilohertz signal to the controller 28.

The power system 20 provides power to the computer 10 and is coupled to the controller 28 by a dedicated bi-directional bus 74. The bus 74 allows for the handling of fault detection signals (e.g. low power), switching on and off power to the PCMCIA connector 24, etc. The power system 20 preferably operates to conserve power at times of low usage of the pen-based computer system 10.

The sound system 22 includes a small (18 mm diameter) loudspeaker 76 and a D/A converter 78. The D/A converter 78 is coupled to the controller 28 by a line 80, and to the loudspeaker 76 by a line 82. In the present embodiment, the D/A converter 78 is a simple operational amplifier (OP AMP) which acts as an integrator to integrate pulse width modulation (PWM) signals developed on line 80 to provide an analog signal on line 82 to drive loudspeaker 76. Of course, more complex D/A converters can also be used to provide higher quality sound output from loudspeaker 76, as will be apparent to those skilled in the art. Suitable OP AMPS to be used as a D/A converter 78 are readily available on the commercial market, and the miniature loudspeaker is also readily available, such as from Hosiden of Osaka, Japan.

The PCMCIA connector 24 is coupled to the controller 28 by a dedicated data (D') bus 84, a dedicated address (A') bus 86, and a dedicated control (C') bus 88. The PCMCIA specifications for signals on the dedicated data, address, and control busses are industry standard and highly available as the "PC Card" or "PCMCIA" standard. A variety of devices can fit in the PCMCIA slot 24, including memory expansion cards, miniature hard disk drive cards, modem cards, and pager cards, to name a few.

The serial I/O system 26 includes a Serial Communications Controller (SCC) 90, an infrared (IR) transceiver 92, a serial port 94, and a line driver (LD) 96. The SCC 90 is coupled to the data bus (D) 30 by a bus 98 and to the controller 28 by a bus 100. A suitable SCC 90 can be purchased from Zilog Corporation of San Jose, Calif. as part number Z85C30. The Zilog Z85C30 has been available since at least the early 1980's and supports a number of serial protocols. The IR transceiver 92 is coupled to the SCC 90 by a line 102 for received IR signals, and to the controller 28 for IR signals to be transmitted. The IR transceiver 92 includes an IR transmitter (coupled to line 104) and an IR receiver (coupled to line 102), and is available under license from Sharp Corporation of Japan. The IR receiver includes a PIN-type IR-sensitive diode having an output coupled to an analog demodulator and an amplifier to create a signal on line 102, an IR LED coupled to line 104 to be directly driven by a high-power switch of controller 28. The serial port 94 is a standard DIN 8 (8 pin) connector, and is coupled to the line driver LD 96 by an eight bit bus 106. The LD 96 is coupled to the SCC 90 by a bus 107.

Figure 2:
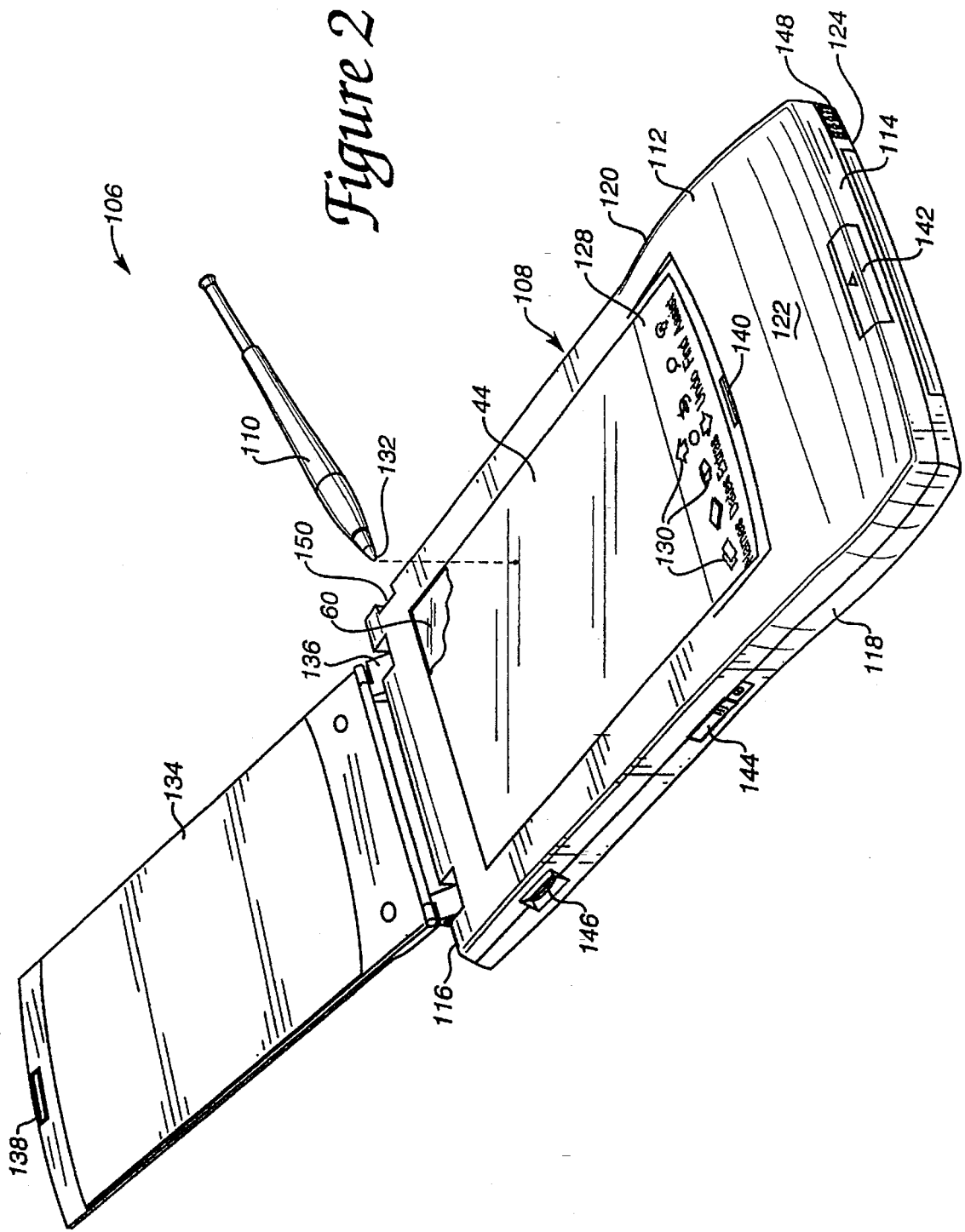
FIG. 2 is a perspective view of a complete pen-based computer system including a housing, display assembly, and stylus, where the electronics of FIG. 1 are enclosed within the housing.

Referring now to FIG. 2, a pen based computer system 106 in accordance with the present invention includes the computer 108 and a pen or stylus 110. The computer 108 is enclosed within a generally flat, rectangular case 112 having a front end 114, a back end 116, a left side 118, a right side 120, a top 122, and a bottom 124. The LCD 60 is positioned along the top 122 of the case 112, and the clear membrane tablet 44 is positioned over the LCD 60. Also positioned beneath the tablet 44 along a lower edge 126 thereof, is a printed strip of material 128 including a number of indicia 130. When the tip 132 of the stylus 110 is engaged with the membrane 44 over one of the indicia 130, the computer 108 can respond to the contact as if the indicia were a "button." Therefore, as used herein, a "button" can be an image seen through the tablet 44 (either from the screen 60 or from printed material 128 or the like) that can serve the function of an electro-mechanical button or the like when the tablet 44 is activated over a button image.

A lid 134 is connected to the back end 116 of case 112 by hinge 136. When open as shown or folded back to contact the bottom 124 of case 112, the tablet 44 and screen 60 are available for use. When the cover 134 is folded over the top 122 of case 112, it fully covers the tablet 44 to protect the delicate membrane material. The lid 134 is provided with a latch member 138 which engages a latch member 140 when it is overlying the top 122 of the computer. The latch member 138 is disengaged from the latch member 140 by a mechanical latch release 142.

Also seen in FIG. 2 is an "on" switch 144, a contrast adjustment 146, and a grille 148 for the speaker 76. The stylus 110 is of a collapsible design and can fit into an opening 150 along the right side 120 of case 112. Not seen in this figure along the right side 120 of the case 112 is an opening for a PCMCIA card which can engage PCMCIA connector 24, the DIN 8 port 94, and power input jack. Not seen along the bottom 124 of the case 112 is a battery access cover and a mechanical ejection button for a PCMCIA card engaged with the PCMCIA connector 24. The IR port 92 is provided along back 116 of the case 112 and is exposed for use when the cover 134 is folded against the bottom 124 of the case 112. The remaining components and systems of the computer block diagram 10 of FIG. 1 are enclosed within the case 112 of the computer system 108.

It should be noted that the preceding discussion is of a preferred embodiment of the present invention, and that there are many alternatives for the stylus 110 as illustrated. For example, a fingernail or other pointed object could be used with the tablet 44 of the present invention. Also, there are other types of tablets available that utilize other types of stylus.

Other types of pointing devices can also be used in conjunction with the present invention. While the method of the present invention is described in the context of a pen-based system, other pointing devices such as a computer mouse, a track ball, a track pad, a tablet, etc. can be used to manipulate a pointer on a screen of a general purpose computer. Therefore, as used herein, the terms "pointer", "pointing device", "pointing apparatus", "pointing means", and the like will refer to any mechanism, device, or system for designating to a particular location on a screen of a computer display.

Figure 3:
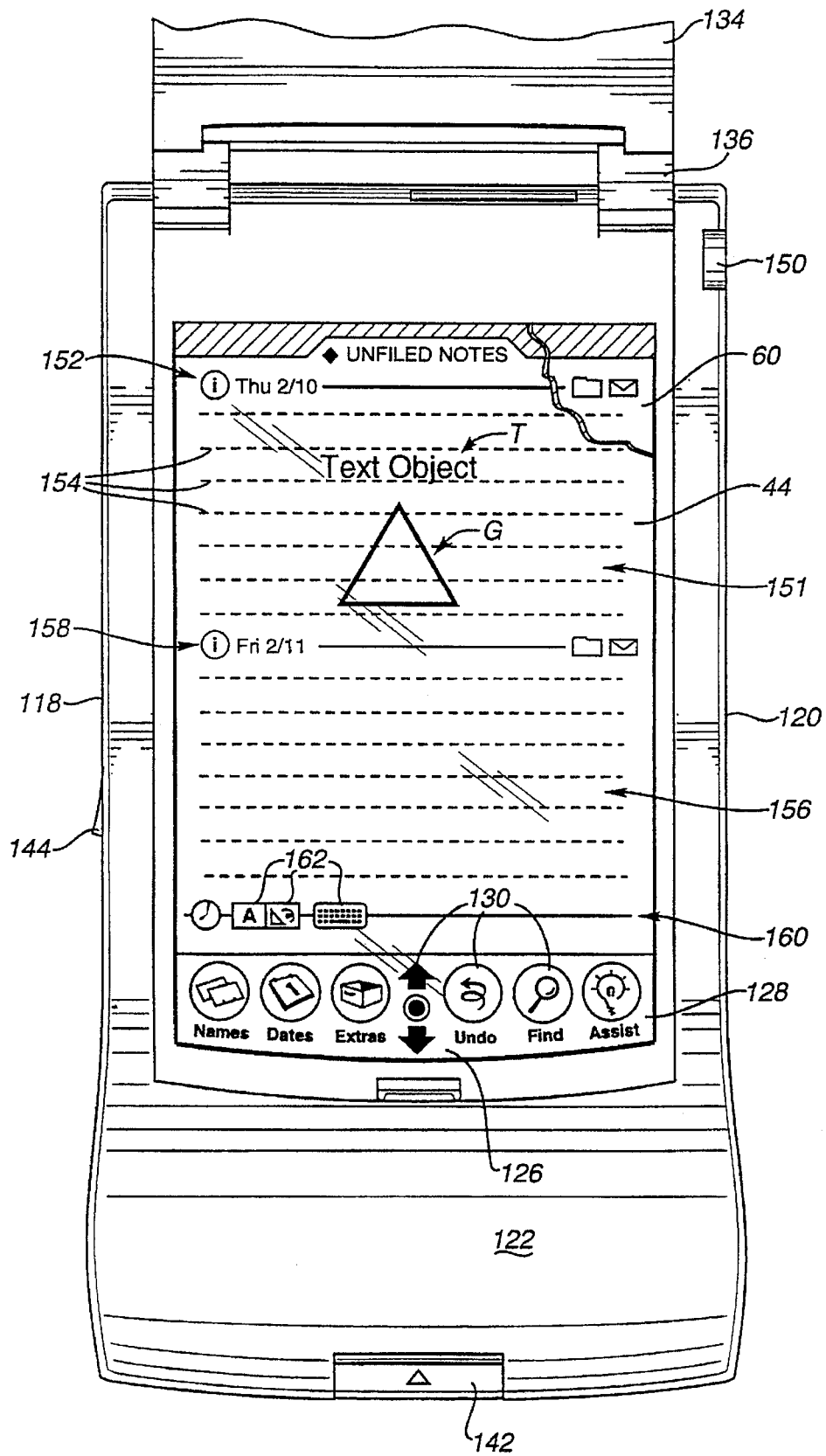
FIG. 3 is a top plan view of the housing and display assembly of pen-based computer system of FIG. 2.

With additional reference to FIG. 3, information is input into the pen-based computer system by "writing" on the tablet 44 with stylus 110 or the like. Information concerning the location of the tip 132 of stylus 110 on the tablet 44 of the display system 16 is input into the CPU 12 via controller 28. Typically, this information comprises the Cartesian (i.e. x & y) coordinates of a pixel of the screen 60 over which the tip 132 of the stylus 110 is positioned. The CPU 12 then processes the data under control of an operating system (stored in ROM 40) and possibly an application program stored in memory system 14 or elsewhere (such as on a PCMCIA card engaged with PCMCIA connector 24). The CPU 12 next produces data which is transferred to the screen 60 via ASIC 56 to produce appropriate images on the screen.

Upon power-up, pen based computer system 106 displays on screen 60 an initial "note" area 151 including a header bar 152 and a number of guidelines 154. The header bar 152 preferably includes the date of creation of the note area 151 and a number of icons and "soft" buttons, not particularly germane to the discussion of the present invention. The guidelines 154 aid a user in entering text, graphics, and data into the pen-based computer system 106. A text object T of the text "Text Object" and a graphic object G of a triangle are shown as being entered within note area 151.

Additional note areas, such as a second note area 156, can be formed by the user by drawing a substantially horizontal line across the tablet 44 with the stylus 110 or by tapping a "new" button 162. The substantially horizontal line is recognized by the computer system 106 and is converted into a second header bar 158. Additional text, graphical, and other data can then be entered into this second note area 156.

The screen illustrated in FIG. 3 is referred to as the "notepad", and is preferably an application program running under the operating system of the pen based computer system 10. In this preferred embodiment, the notepad is a special or "base" application which is usually or normally available beneath higher level applications. The notepad application, like other applications, run within a window, which in this instance comprises the entire screen 60. Therefore, as used herein, a "window" is the entire screen or any portion of an entire screen which is dedicated to a particular application program. A description of the operation and use of the notepad can be found in U.S. Pat. No. 5,398,310, assigned to the assignee of the present invention, and incorporated herein by reference.

A status bar 160 is provided at the bottom of the notepad application. The status bar 160 is provided with a number of active and display areas, which again are not particularly germane to the present invention and will therefore not be discussed in detail herein.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh*, by Kurt J. Schmucher, Hayden Book Company, 1986.

In the present invention, objects may be implemented as part of a frame system that comprises frame objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

It will be noted there is a liberal use of graphic elements in the present invention. For example, the header bars 152 and 158 include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh*, Volumes I, II, and III, by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 60 can form a first or "root" layer, with the status bar 160, for example, positioned in a second layer "over" the root layer. The various buttons 162 of the status bar 160 are positioned in a third layer "over" the second and root layers. The view system automatically handles "taps" and other gestures of the stylus 110 on the screen 60 by returning information concerning the tap or gesture and any object to which it may be related. U.S. patent application Ser. No. 07/976,970 filed Nov. 16, 1992 on behalf of Foster et. al, entitled "Status Bar for Application Windows" and assigned to the assignee of the present invention describes a preferred view system and how to make and use the status bar, and is incorporated herein by reference.

The object oriented programming and view system software makes the implementation of the processes of the present invention less cumbersome than traditional programming techniques. However, the processes of the present invention can also be implemented in alternative fashions, as will be well appreciated by those skilled in the art.

The teachings of the present invention are directed towards adjusting a bounds (i.e. the boundaries) of an event. Typical events which are contemplated may be divided into the two groups of reoccurring meetings and non-reoccurring meetings. In either case, the bounds of an event are defined by event parameters which, in the general case, include an event start boundary, an event stop boundary, and an event duration. By way of example, if a given event were a reoccurring meeting which occurred every Thursday, had its first occurrence on Jul. 6, 1995, and reoccurred through the end of August, 1995, then the following initial event parameters could be determined. An event start boundary would be the event start date Thursday, Jul. 6, 1995. An event stop boundary would be the event start date Thursday, Aug. 31, 1995. Additionally, an event duration could be defined equivalently as one of fifty-six days, eight weeks, two months, etc.

As a further example, if another given event were an Examiner interview scheduled on a particular day from 1:30 PM to 2:00 PM, the following event parameters may be determined. An event start boundary is the event start time 1:30 PM, an event stop boundary is the event start time 2:00 PM, and an event duration is the time period of thirty minutes. Note that this particular meeting could be either a reoccurring or non-reoccurring meeting. Furthermore, according to the present invention, event parameters defining the event start date, the event stop date, and the duration of event reoccurrence (when necessary) may be provided and modified.

In further characterization of the events contemplated within the present invention, an event parameter interdependence exists whereby the event start boundary and the event stop boundary may be tied to one another. That is, when the event start boundary is tied to the event stop boundary, a modification to the event start boundary will induce a corresponding modification to the event stop boundary while the event duration remains constant. In the other case, when the event start boundary is not tied to the event stop boundary, a modification to the event start boundary will cause a corresponding change in the event duration.

A general process for adjusting the parameters of an event is described as follows. Initially, an event adjustment window is displayed showing the event start boundary, the event stop boundary, and the event duration. In some embodiments, the event adjustment window is explicitly invoked by a user of a pen-based computer system. In other embodiments, the event adjustment window may be invoked automatically any time an event (or the event parameters) is accessed or when a new event is created. In any case, once the event adjustment window is displayed, the user enters an event adjustment input explicitly intended to modify either the event start boundary, the event stop boundary, or the event duration. Accordingly, depending upon the event parameter interdependence, each non-selected event parameter will be accordingly modified. In completing the adjustment, the event adjustment window is displayed showing the event start boundary, the event stop boundary, and the event duration as appropriately modified.

In order to further clarify the present invention, the subsequent discussion of FIGS. 4–20 provide detailed description regarding a couple of embodiments of the present invention. Specifically, with reference to FIGS. 4–13, a variety of event parameter adjustment methods for a time picker event adjustment window 250 in accordance with the present invention will be described. Additionally, with reference to FIGS. 4 and 14–20, a variety of event parameter adjustment methods for a date picker adjustment window 520 in accordance the present invention will be described. As will be appreciated, within the following description more details of the present invention will come forth.

Figure 5:
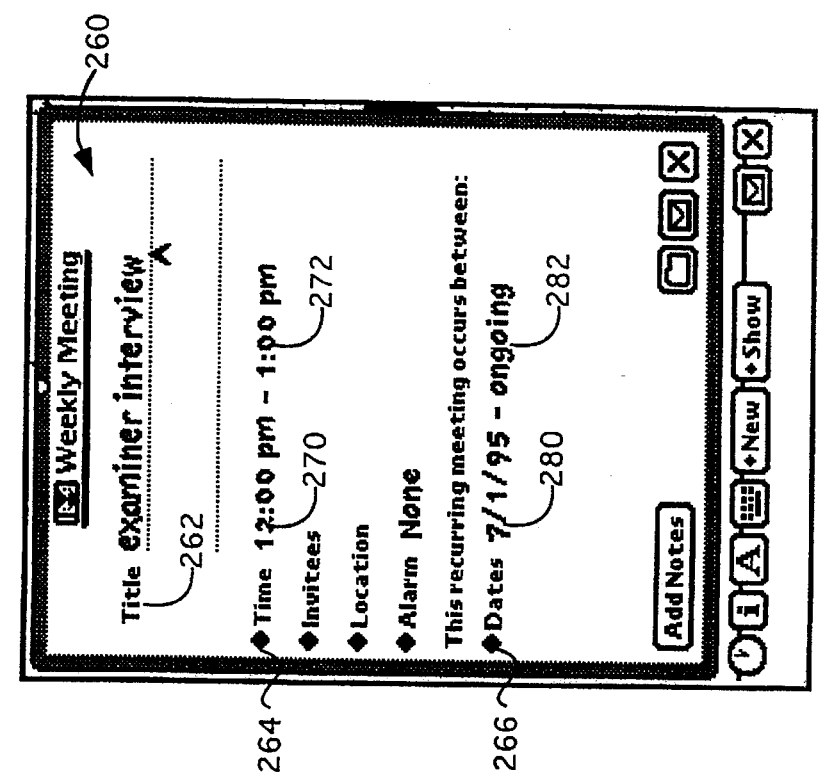
FIG. 5 is a computer screen display illustrating an event slip in accordance with another embodiment of the present invention.
Figure 4:
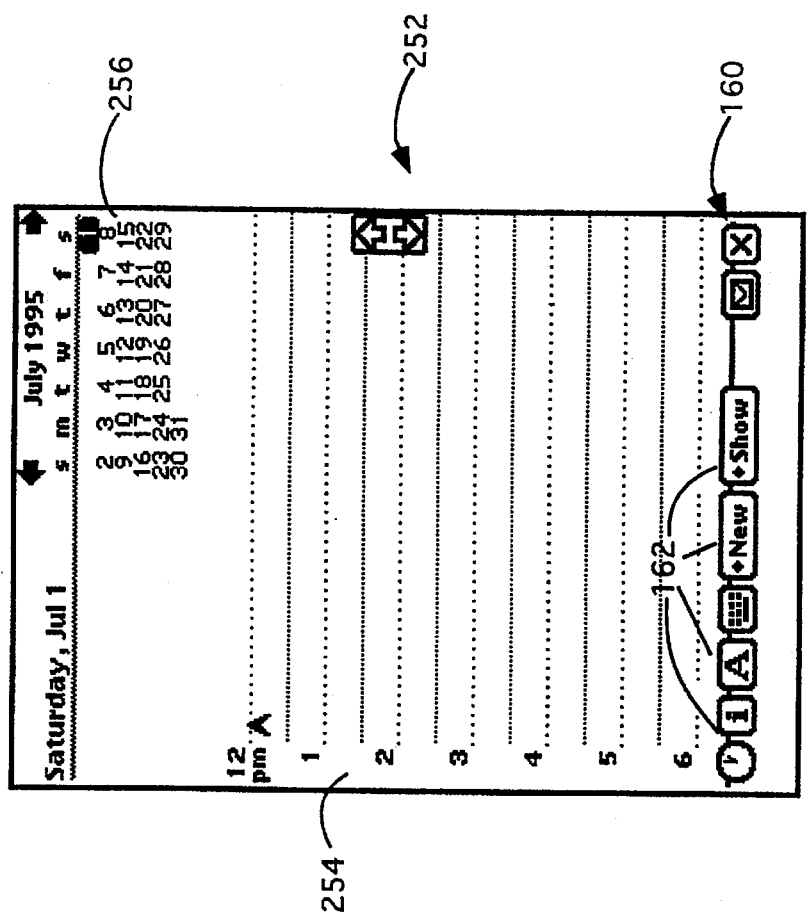
FIG. 4 is a computer screen display illustrating an event scheduler in accordance with one embodiment of the present invention.
Figure 6:
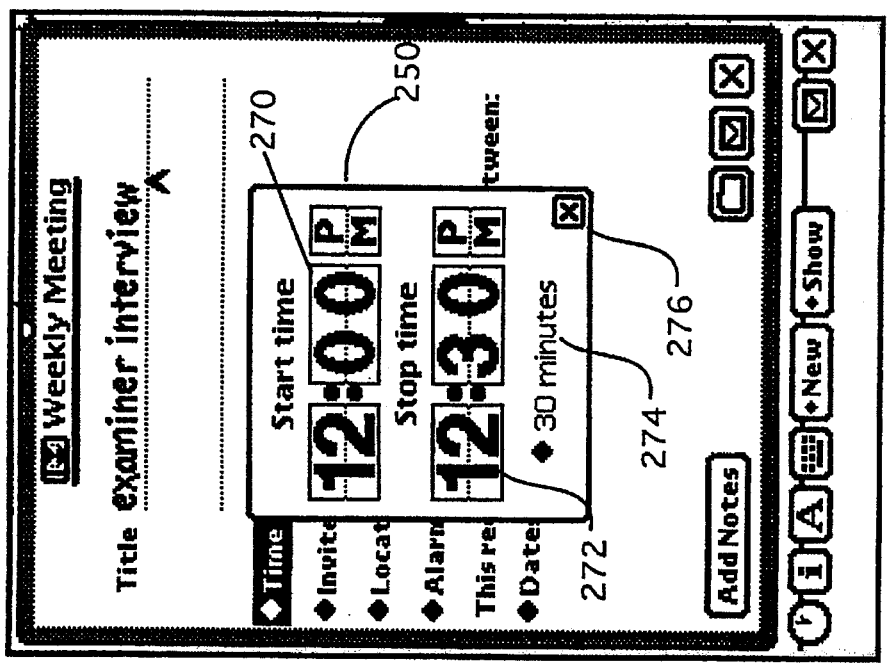
FIG. 6 is a computer screen display illustrating a time picker event adjustment window in accordance with yet another embodiment of the present invention.

Turning directly to FIGS. 4–6, a suitable process for invoking a time picker event adjustment window 250 displaying the time boundaries of an event (reoccurring or non-reoccurring) in accordance with one embodiment of the present invention will be described.

FIG. 4 is a computer display screen illustrating an event scheduler 252 having a multiple hour time block 254 displayed therein and a calendar 256 displayed in its upper right hand corner. Note that the date highlighted within the calendar 256 is the day containing the displayed time block 254. Additionally, the event scheduler 252 includes a status bar 160 having a variety of buttons 162.

In one embodiment of the present invention, a user may initially schedule an event by using a stylus 110 to draw a duration bar (not shown) within the time block 254. The duration bar will provide an indication of the start boundary, duration period, and stop boundary of the scheduled event. For a more detailed description of one suitable embodiment of duration bars, please see Capps et al's copending U.S. patent application Ser. No.

Tapping twice on the duration bar invokes an event slip 260 as shown in FIG. 5. The event slip 260 is a computer display window which includes a title field 262, a time field 264, and a date field 266. With respect to the event slip 260, there exist two separate sets of event parameters: a first set corresponding to the event time parameters and a second set corresponding to the event date parameters. These are: an event start time 270, an event stop time 272, and an event duration 274 (not shown in FIG. 5); and an event start date 280, an event stop date 282, and an event duration 284 (not shown in FIG. 5).

In the embodiment of FIG. 5, a single tap with the stylus 110 on either of the time field 264 (or the date field 266) will invoke the time picker event adjustment window 250 (or a date picker event adjustment window 520) in accordance with the present invention.

The operation of a time picker event adjustment window 250 will now be described with reference to FIGS. 6–14. As shown in FIG. 6, the time picker 250 includes a start time 270, a stop time 272, an event duration 274, a close request box 276, and appropriate labeling.

Figure 7:
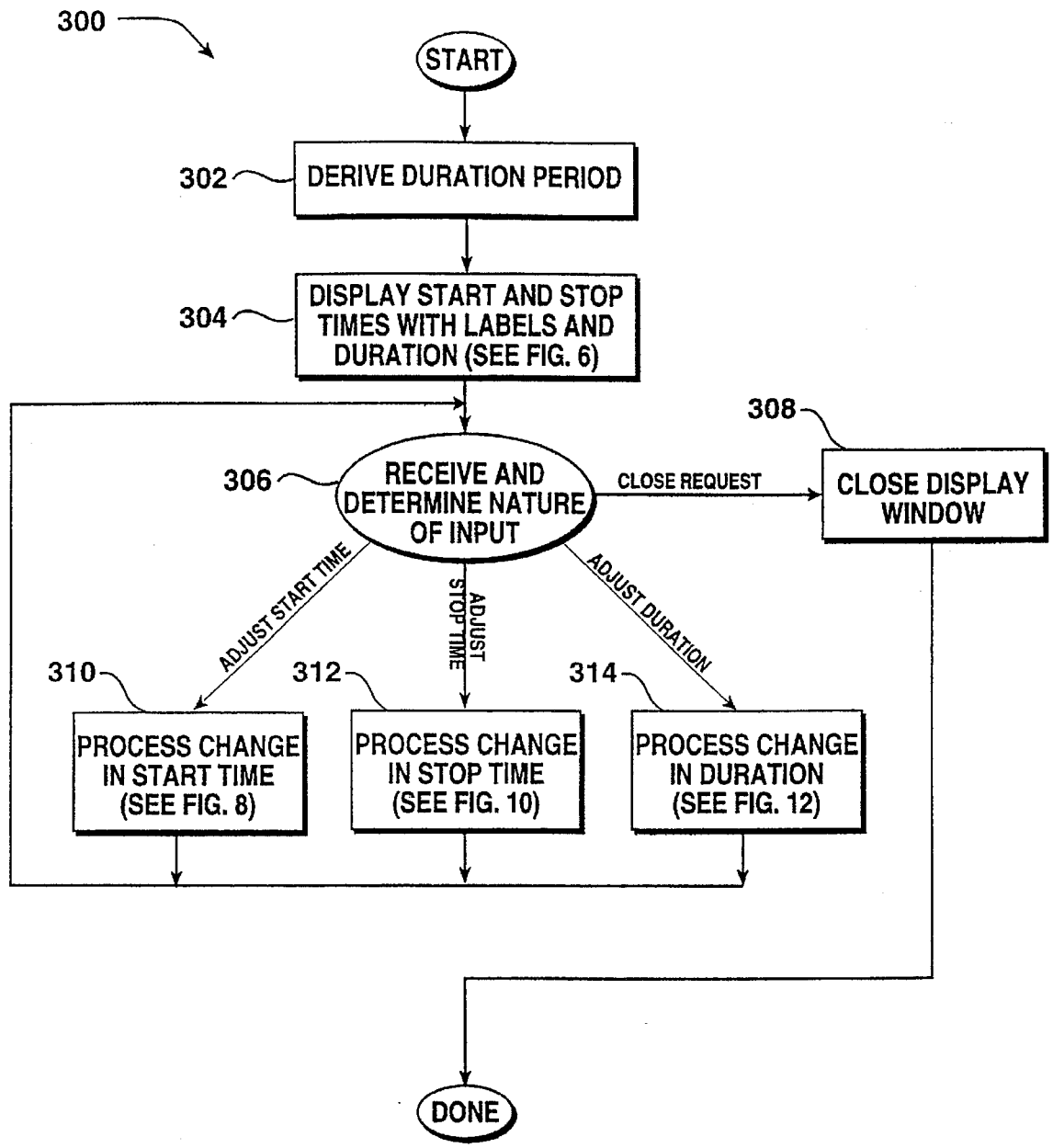
FIG. 7 is a flow chart illustrating an adjustment method for invoking a time picker event adjustment window and modifying event parameters in accordance with one aspect of the present invention.

With attention focused on FIG. 7, an event adjustment method 300 for displaying a time picker adjustment window 250 and adjusting the associated event parameters in accordance with one aspect of the present invention will now be described. As previously described with reference to FIGS. 4–6, an event adjustment window 250 may be invoked by the user through a sequence of stylus 110 operations. According to the event adjustment method 300, an initial step 302 responds to the user's invocation by deriving an event duration 274 from two other available event parameters: an event start time 270 and an event stop time 272. Then, a step 304 displays the event parameters along with appropriate labeling. By way of example, in the time picker event adjustment window 250 of FIG. 6, the phrases "Start time" and "Stop time" are displayed directly above their respective parameters.

Once the event adjustment window 250 is displayed, a step 306 waits for and receives an event adjustment input intended to modify an event parameter. The step 306 further determines the nature of the event adjustment input and passes control of method 300 to an appropriate processing routine. Possible event adjustment inputs include adjusting the event start time 270, adjusting the event stop time 272, and adjusting the duration 274. Note that each of these event adjustment inputs is explicitly meant to adjust one of the event parameters. However, depending upon the interdependence between the event parameters, an explicit modification of one parameter will implicitly require modification of one of the other event parameters.

When the event adjustment input is intended to adjust the start time 270, control is passed to a step 310 which processes the user's adjust start time input. In the embodiment of FIG. 6, the user may tap on that portion of the displayed start time 270 which they wish to alter. For example, tapping once on the top of the hour marker will cause the start time 270 to increase by one hour. One suitable embodiment of step 310 will be described below with reference to FIG. 8 while one example will be described with respect to FIG. 9.

When the event adjustment input is intended to adjust the stop time 272, control is passed to a step 312 which processes the user's adjust stop time input. In some embodiments, the user may tap on that specific portion of the displayed stop time 272 which they wish to alter. For example, tapping on the bottom section of the minute display of the stop time 272 will decrease the minutes by an appropriate value. One suitable embodiment of step 312 will be described below with reference to FIGS. 10 and 11.

When the event adjustment input is intended to adjust the event duration 274, control is passed to a step 314 which processes the user's duration adjustment input. In some embodiments, by tapping on the displayed event duration 274, a pop-up menu 278 is invoked displaying a number of duration alternatives. In turn, the user may select one of the duration alternatives, or invoke another process to specify a duration not available in the pop-up menu 278. One suitable embodiment of step 314 will be described below with reference to FIGS. 12 and 13.

After each of the adjustment steps 310, 312, and 314, the method 300 loops back to the input step 306 to await further commands from the user. One additional event adjustment input is a close request. A step 308 responds to the user's close request by closing the event adjustment display window 250. In the embodiment of FIG. 6, the close request is generated by the user tapping on the close request box 276.

Figure 8:
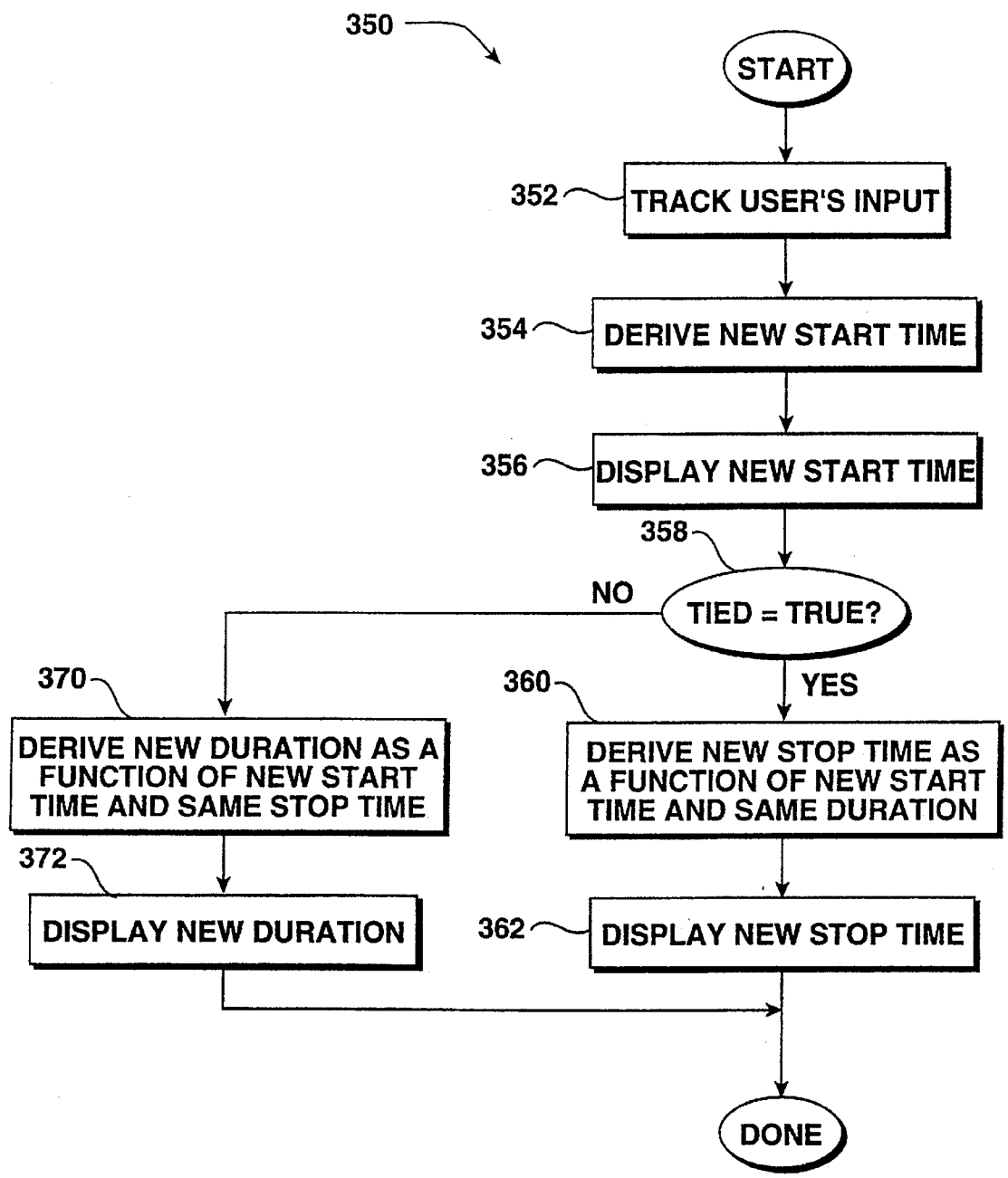
FIG. 8 is a flow chart illustrating one suitable embodiment of step 310 of FIG. 7.

Turning directly to FIG. 8, a method 350 for adjusting a start time 270 in accordance with one embodiment of the present invention will be described. As will be appreciated, the method 350 provides a suitable method for performing step 310 of FIG. 7. Initially, a step 352 tracks a user's input which is intended to adjust the start time 270. For example, in the embodiment of FIG. 6, the user may tap on a portion of the event start time 270, or may hold the stylus 110 down on the same portion of the event start time 270, each action having different results. In some embodiments, the single tap is interpreted as a request to adjust the start time 270 by a predefined block of time. In turn, holding the stylus 110 down is interpreted as a request to continuously adjust the start time, perhaps accelerating the adjustment rate so that it changes faster the longer the stylus 110 is depressed. In any event, after the user's input is tracked and properly determined, a step 354 derives a new start time explicitly from the user's input. Then, a step 356 displays the new event start time 270.

As will be appreciated, in some situations it will be useful for the event start time 270 and the event stop time 272 to be tied together, while in other situations these parameters should be independent (which, by default, ties together the event start time 270 and the event duration 274). Correspondingly, whether the event start time 270 and the event stop time 272 are tied together also determines an associated effect on the event duration 276. Thus an event interdependence exists which defines how each event parameter interacts with one another. In the embodiment of FIG. 8, a variable TIED can be set to a value of either TRUE or FALSE thereby indicating whether the event start time 270 and the event stop time 272 are tied together. This variable may be, in some form, available for setting by the user, or may be hidden from the user and predetermined by a software developer implementing the present invention.

In any event, a step 358 determines if the variable TIED equals true. That is, it is determined if the event start time 270 and the event stop time 272 tied together. When the event start time 270 and the event stop time 272 are tied together, control passes to a step 360 which determines a new event stop time 272 as a function of the new event start time 270 and the original event duration 274 (which does not change). This would be appropriate in any situation wherein the event duration was a fixed length. For example, the recommended length for an interview with a Patent Examiner is one-half hour. Thus, regardless of the new event start time 270 (unless an exception is made), the event duration 274 will be a constant one-half hour. Once the new event stop time 272 is determined, a next step 362 will complete the adjustment process by providing feedback to the user in the form of displaying the new event stop time 272.

When the event start time 270 and the event stop time 272 are not tied together, modifying the event start time 270 will not modify the event stop time 272. In this case, control passes from determination step 358 to a step 370 which derives a new event duration 274 as a function of the new event start time 270 and the original event stop time 272. This would be appropriate in situations where an event is limited by an unalterable event stop time 272. For example, if multiple events are being scheduled one after the other, then a first event stop time 272 of a first event would be limited by a fixed second event start time 270 of a second event. After the new event duration 274 is determined, a step 372 will complete the adjustment process by displaying the new event duration 274.

Figure 9:
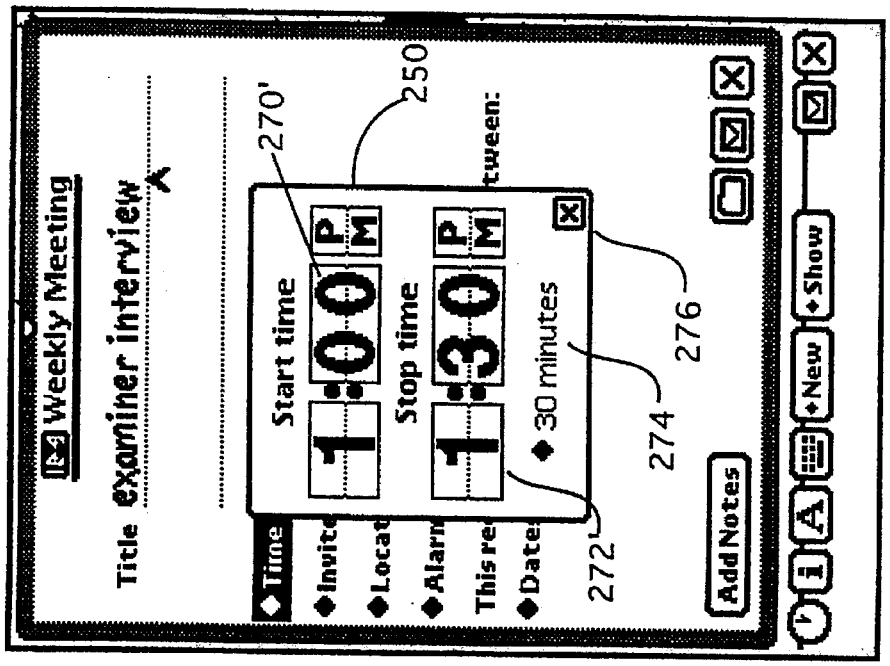
FIG. 9 is a computer screen display illustrating an adjustment to an event start time in accordance with the method of FIG. 8.

With reference to FIGS. 6 and 9, an example of an adjustment of an event start time 270 in accordance with one embodiment of the present invention will now be described. In FIG. 6, a time picker event adjustment window 250 is displayed wherein the event start time 270 has a value of "12:00 PM." Assuming the variable TIED equals TRUE (i.e., the event stop time 272 is dependent upon the event start time 270), adjusting the event start time 270 by one hour accordingly generates both a new event start time 270' having a value "1:00 PM" and a new event stop time 272' having a value "1:30 PM", as illustrated in FIG. 9. However, as shown, the event duration 274 does not change. As a related aside, the user may have tapped on the "PM" button, and the event schedule would have changed into "AM" time yet the event duration would not have changed.

Focusing next on FIG. 10, a method 400 for adjusting an event stop time 272 in accordance with another embodiment of the present invention will now be described. The method 400 is suitable with some embodiments of the present invention for implementing step 312 of FIG. 7. An initial step 402 tracks a user's input which is explicitly intended to modify the event stop time. Thus step 402 would monitor the user's button selection with the stylus 110 and determine if one or more taps were entered, or whether contact with the stylus was being constantly maintained. Then, based upon the interpretation of the event adjustment input, a step 404 will derive a new stop time 272'. Accordingly, a step 406 will display the new stop time 272'.

Figure 10:
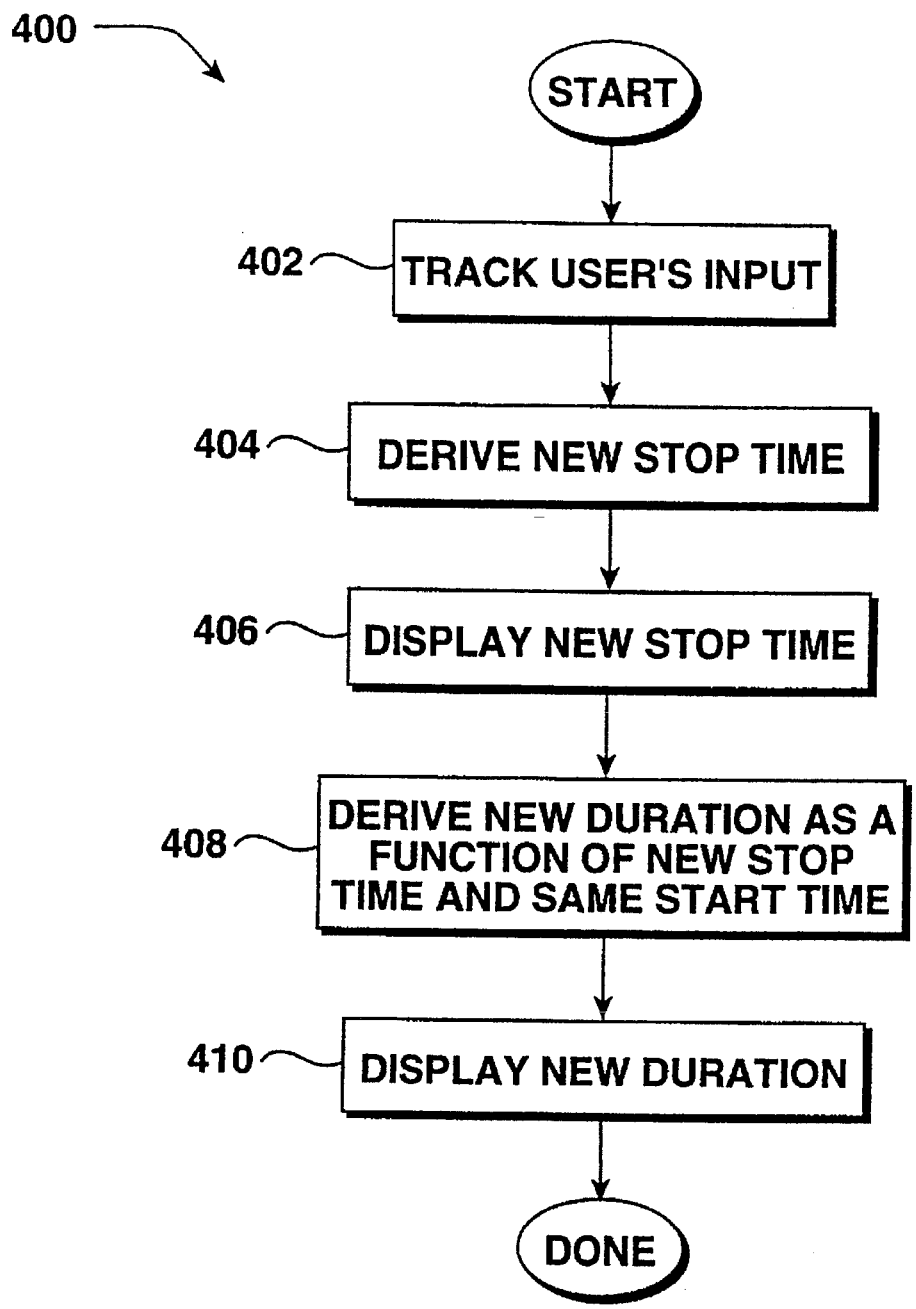
FIG. 10 is a flow chart illustrating one suitable embodiment of step 312 of FIG. 7.

In the embodiment of FIG. 10, the interdependence of the event start time 270 and the event stop time 272 is only in a single direction. That is, the stop time 272 adjusts according to variations of the start time 270, but the start time 270 does not adjust according to variations of the stop time 272. Therefore, the variable TIED does not need to be evaluated at this juncture. Accordingly, a step 408 derives a new event duration 274' and the method 400 does not modify the original start time 270. A step 410 then displays the new event duration 274' and the method 400 is complete.

Figure 11:
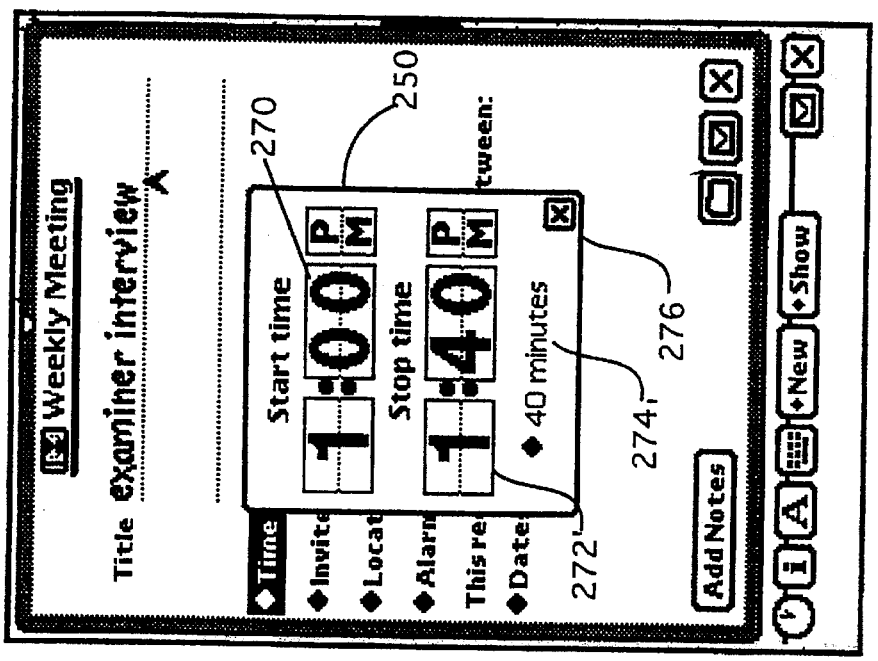
FIG. 11 is a computer screen display showing an adjustment to an event stop time in accordance with the method of FIG. 10.

With reference to FIGS. 9 and 11, an example for modifying an event stop time 272 in accordance with one embodiment of the present invention will now be described. FIG. 11 illustrates a new stop time 272' having a value of "1:40 PM" which was derived from an original stop time 272 of FIG. 9 having a value of "1:30 PM." In one suitable embodiment, the user may perform this adjustment of the event stop time 272 by tapping on the upper portion of the minutes of the displayed event stop time 272. In accordance with the method 400 of FIG. 10, a new event duration 274' having a value "40 minutes" is derived and then displayed in the time picker event adjustment window 250.

Figure 13:
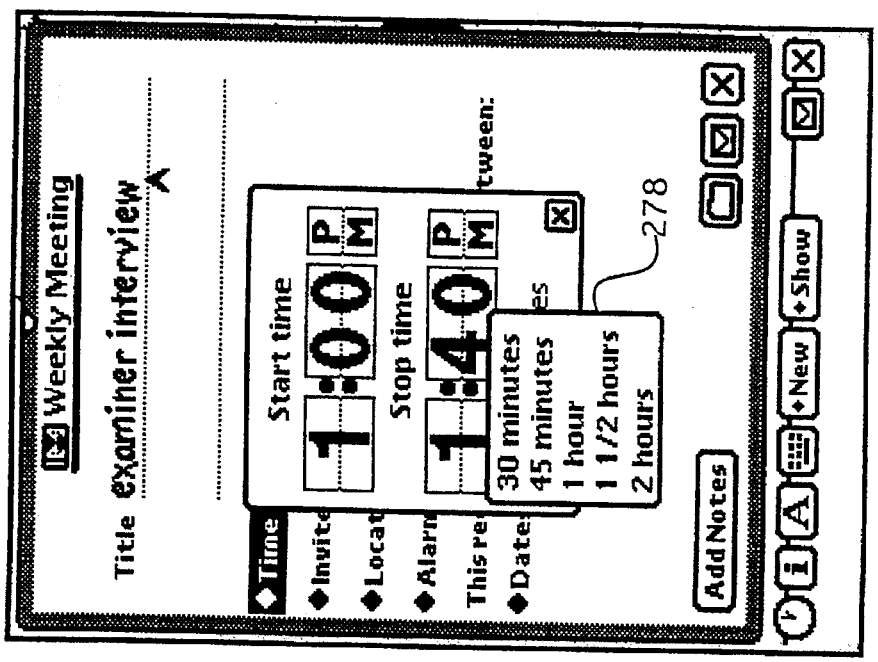
FIG. 13 is a computer screen display showing an event duration pop-up menu in accordance with one embodiment of the present invention.
Figure 12:
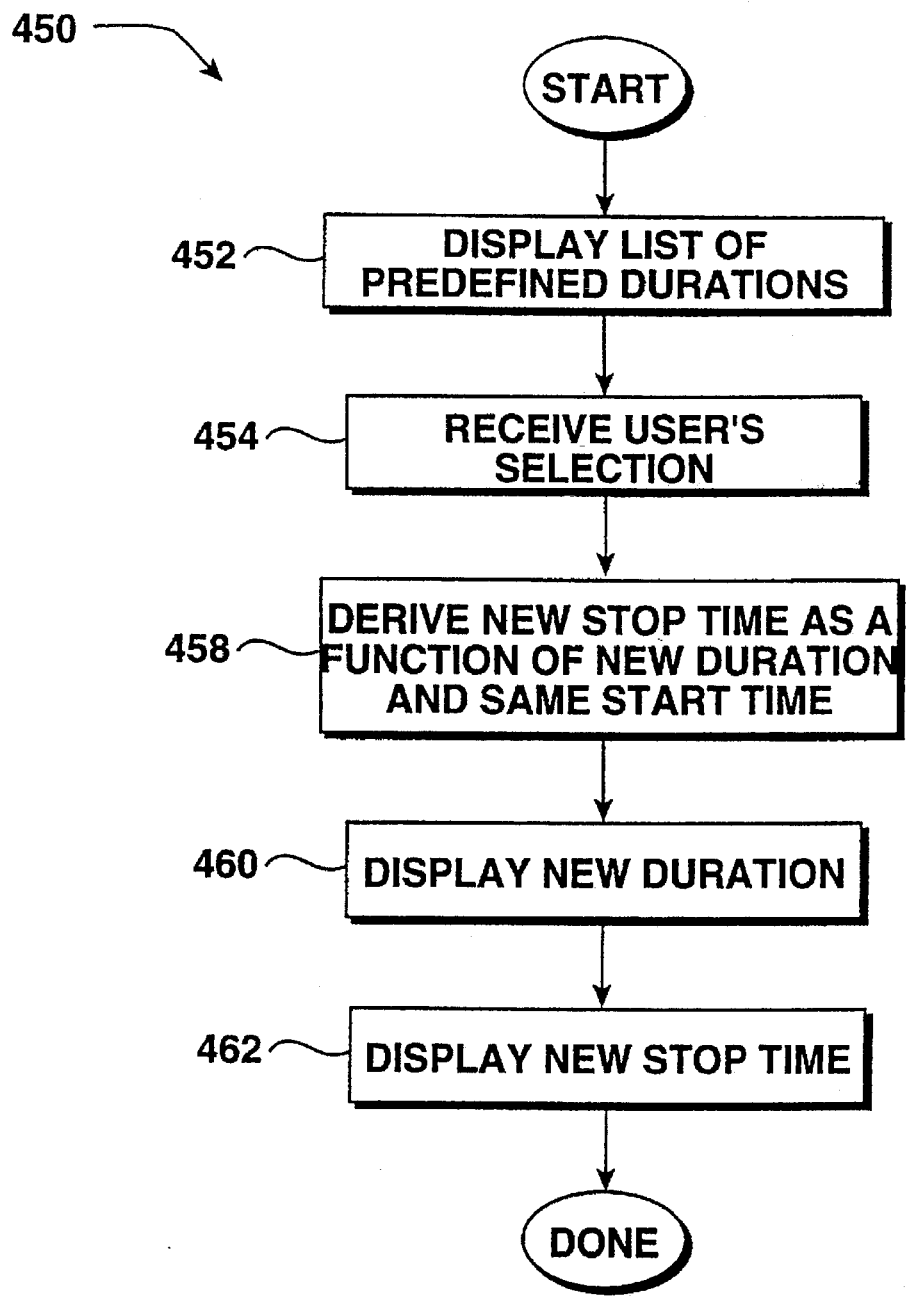
FIG. 12 is a flow chart illustrating one suitable embodiment of step 314 of FIG. 7.

Turning now to FIGS. 12 and 13, a method 450 for modifying an event duration in accordance with one embodiment of the present invention will be described. FIG. 12 is a flow chart of the method 450 while FIG. 13 illustrates a computer screen display showing a time duration pop-up menu 278 having a list of predefined duration periods. According to one embodiment of the present invention, a user may invoke the predefined duration pop-up menu 278 by tapping on an event duration 274. The predefined duration pop-up menu 278 will provide the user with a number of different duration periods for selection. Again, the user may select one of the displayed durations by tapping it with the stylus 110.

A first step 452 of the method 450 displays the list of predefined durations in response to an invocation. For example, as discussed in the preceding paragraph, the user may explicitly invoke the predefined duration pop-up menu 278 by tapping on the event duration. However, other embodiments may automatically display the event duration pop-up menu 278 whenever a time picker event adjustment window 250 is displayed. Additionally, the pop-up menu 278 may take another suitable form which further includes a modifiable duration period. By selecting the modifiable duration period, the user may enter an arbitrary period of duration as opposed to one of the predefined options. In any event, a next step 454 receives the user's selected duration period which becomes a new event duration 274'. Then, a step 458 derives a new event stop time 272' as a function of both the original event start time 270 and the new event duration 274'. Steps 460 and 462 display the new event duration 274' and the new event stop time 272' respectively. However, as should be apparent, the sequence of steps 460 and 462 may be switched.

With reference to both FIGS. 5 and 15, a sample process for invoking a date picker event adjustment window 520 displaying the date boundaries of a given event in accordance with one embodiment of the present invention will be described. As previously described, the event slip 260 of FIG. 4 includes a date field 266. In turn, the date field 266 has an event start date 280 and an event stop date 282. Similar to the previous discussion regarding the invocation of a time picker event adjustment window 250, a single tap on the date field 266 will invoke the date picker event adjustment window 520.

Figures 15, 17:
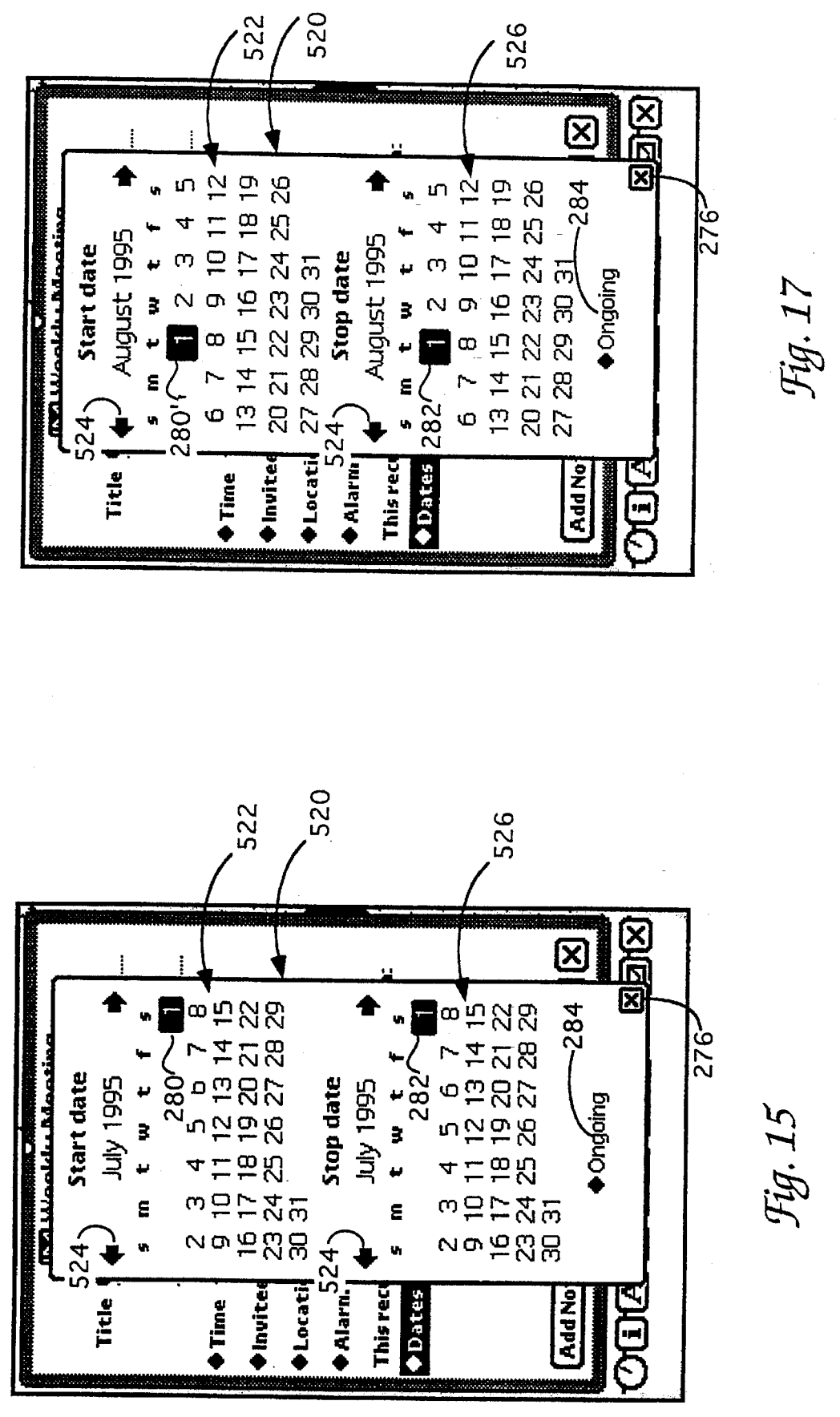

One suitable embodiment of a date picker event adjustment window 520 is shown in FIG. 15. The date picker event adjustment window 520 includes a start date calendar 522 showing an event start date 280, a couple of navigation icons 524, a stop date calendar 526 showing an event stop date 282, and an event duration 284. The value of the event duration 530 as illustrated is "Ongoing." By definition, an "Ongoing" event is reoccurring until an as yet undefined date.

Figure 14:
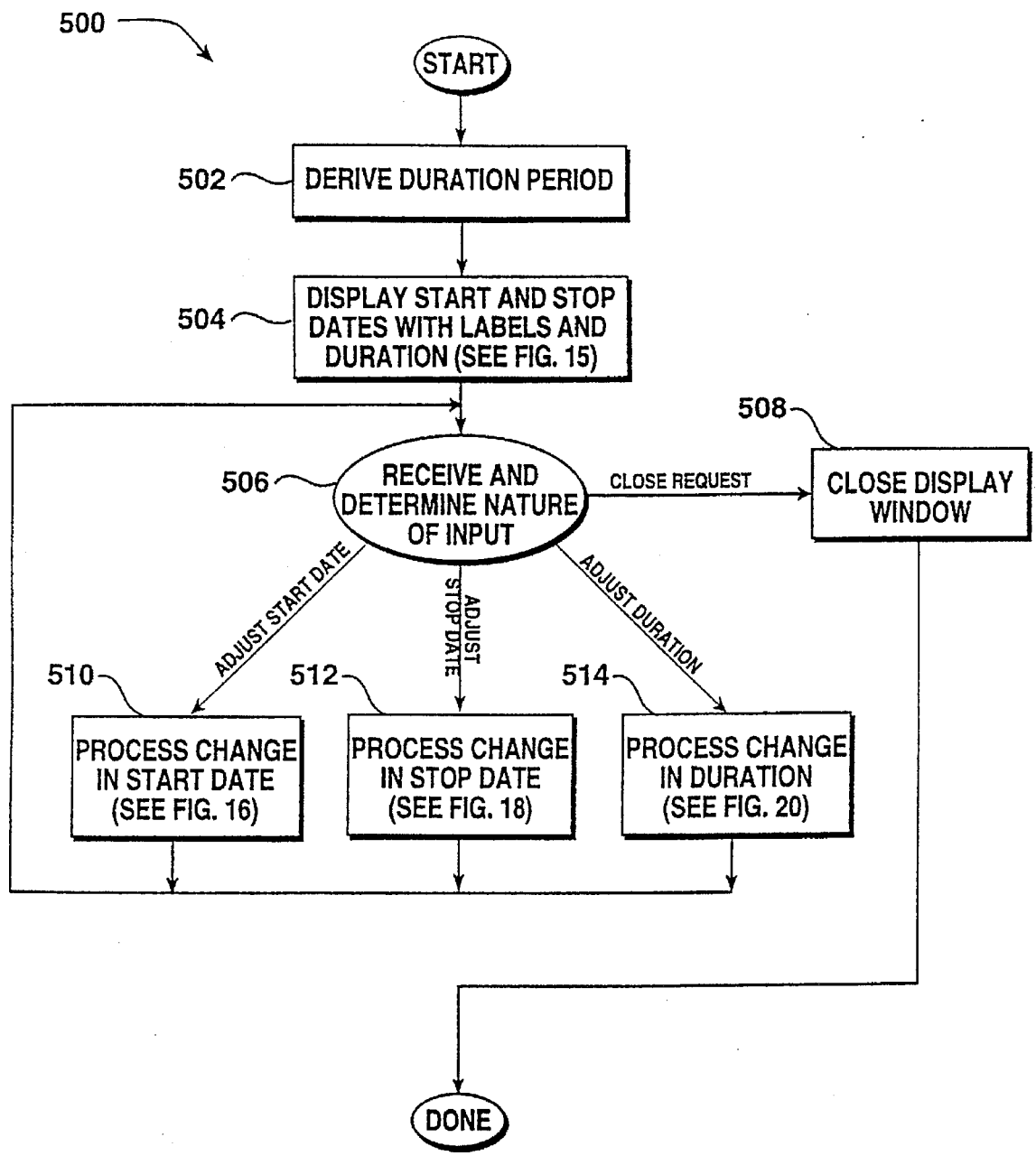
FIG. 14 is a flow chart illustrating an adjustment method for invoking a date picker event adjustment window and modifying event parameters in accordance with one aspect of the present invention.

Focusing attention on FIG. 14, an event adjustment method 500 for displaying a date picker adjustment window 520 and adjusting the associated event parameters in accordance with another aspect of the present invention will now be described. As previously described with reference to FIGS. 5 and 15, a date picker event adjustment window 520 may be invoked by the user through a sequence of stylus 110 operations. An initial step 502 responds to the user's invocation by deriving an event duration 284 from the two other relevant event parameters: an event start date 280 and an event stop date 282. Then, a step 504 displays the event parameters along with appropriate labeling and calendars (in part for contextual information). In the date picker event adjustment window 520 of FIG. 15, the phrases "Start date" and "Stop date" are displayed directly above the start date calendar 522 and the stop date calendar 526, respectively.

Once the date picker event adjustment window 520 is displayed, a step 506 waits for and receives an event adjustment input intended to modify an event parameter. The step 506 further determines the nature of the event adjustment input and passes control of method 500 to an appropriate processing routine. Some possible event adjustment inputs include adjusting the event start date 280, adjusting the event stop date 282, and adjusting the event duration 284. Note that each of these event adjustment inputs is explicitly intended to adjust one of the event parameters. However, depending upon the interdependence between the event parameters, an explicit modification of one parameter may implicitly require modification of one of the other event parameters.

When the event adjustment input is intended to adjust the event start date 280, control is passed to a step 510 which processes the user's adjust start date input. In the embodiment of FIG. 15, the user may select a new event start date 280' by tapping a date shown in the current start date calendar 522, or, the user may navigate through different months by tapping the appropriate navigation icons 524. One suitable embodiment of step 510 will be described below with reference to FIG. 16 while one example will be described with reference to FIG. 17.

When the event adjustment input is intended to adjust the event stop date 282, control is passed to a step 512 which processes the user's adjust stop date input. In the embodiment of FIG. 15, the user may select a new event stop date 282' by tapping a date shown in the current stop date calendar 526, or, the user may navigate through different months by tapping the appropriate navigation icons 524. One suitable embodiment of step 512 will be described below with reference to FIG. 18 while one example will be described with reference to FIG. 19.

When the event adjustment input is intended to adjust the event duration 284, control is passed to a step 514 which processes the user's duration adjustment input. In some embodiments, by tapping on the displayed event duration 284, a pop-up menu 670 is invoked displaying a number of duration alternatives. In turn, the user may select one of the duration alternatives, or invoke another process to specify a duration not available in the pop-up menu 670. One suitable embodiment of step 514 will be described below with reference to FIGS. 20 and 21.

After processing the event adjustment input in any of steps 510, 512, and 514, the method 500 loops back to input step 506 to await further input. One other event adjustment input is a close request. A step 508 responds to the user's close request by closing the date picker event adjustment display window 520. In the embodiment of FIG. 15, the close request is generated by the user tapping on the close request box 276.

Figure 16:
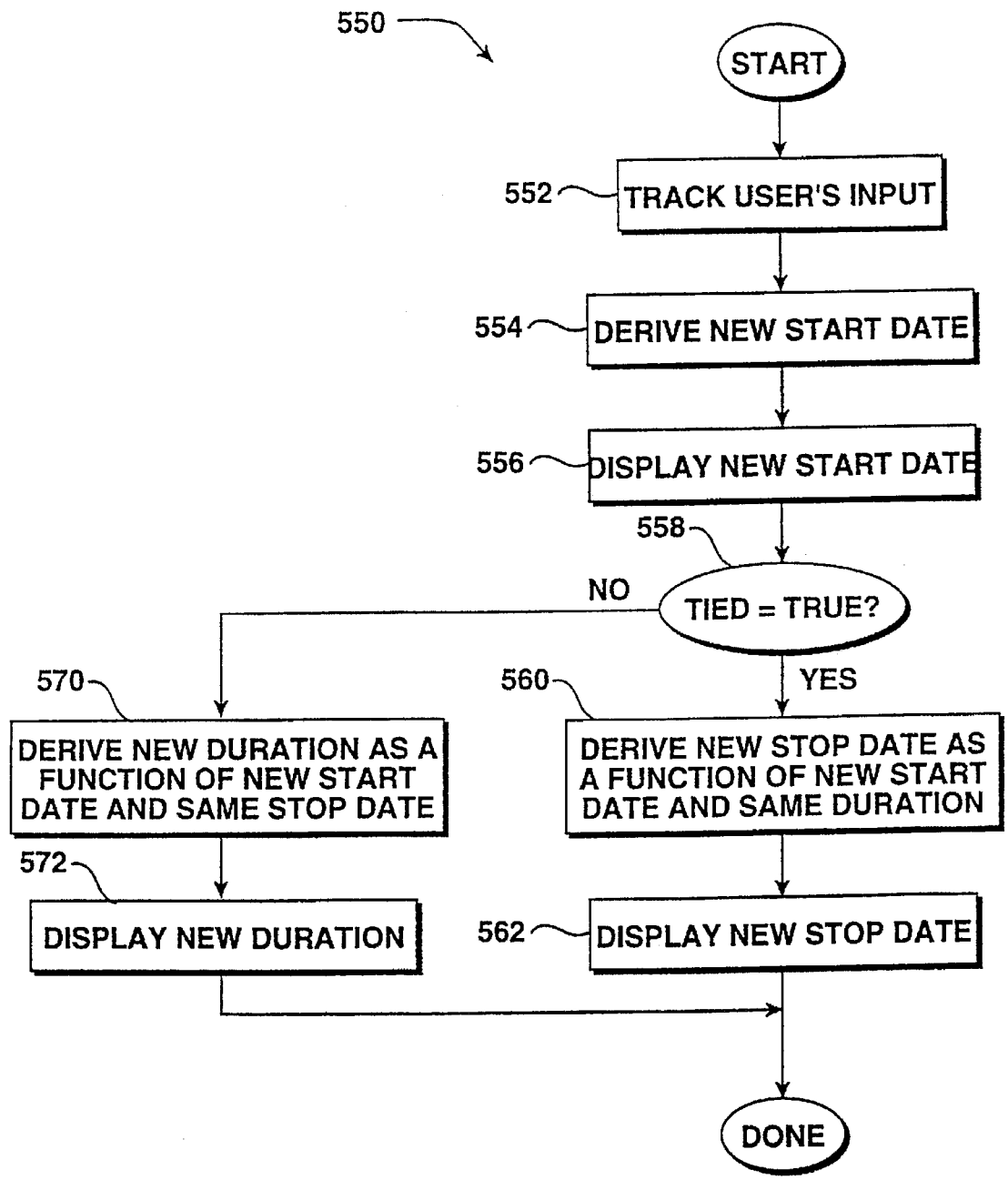
FIG. 16 is a flow chart illustrating one suitable embodiment of step 510 of FIG. 14.

Now focusing attention on FIG. 16, a method 550 for adjusting an event start date 280 in accordance with one embodiment of the present invention will be described. The adjustment method 550 is suitable for implementing step 510 of FIG. 14.

An initial step 552 of adjustment method 550 tracks the user's adjustment input. As described above with reference to FIG. 17, a displayed date may be directly selected by the user from the initially displayed month of the start date calendar 522, or the calendar may be navigated through the different months by way of the navigation icons 524. In any event, once the user's input has been fully determined, a step 554 derives a new event start date 280' based on the user's input. Accordingly, a next step 556 displays the new event start date 280'.

As discussed previously, an event interdependence exists which defines how a modification to one event parameter effects the other relevant event parameters. Similar to a time picker adjustment window 250, the date picker adjustment window 520 will have an associated variable TIED which indicates whether the event start date 280 and the event stop date 282 are tied together. A step 558 determines if the variable TIED has a TRUE value. When the event start date 280 and the event stop date 282 are tied together, control passes to a step 560 which derives a new event stop date 282' as a function of the new event start date 280' and the original event duration 284. Since TIED is TRUE, no modification is made to the event duration 284. Then, a step 562 displays the new event stop date 282' and the method 550 is complete.

In the other case, when the event start date 280 and the event stop date 282 are not tied together, control passes to a step 570 which derives a new event duration 284' as a function of the new event start date 280' and the original event stop date 282. As should be apparent, no modification is made to the event stop date 282. Then, a step 572 displays the new event duration 284' and the method 550 is complete.

With reference to FIGS. 15 and 17, an example of an adjustment of an event start date 280 in accordance with one embodiment of the present invention will be described. In FIG. 15, a date picker event adjustment window 520 is displayed having an event start date 280 of "Jul. 1, 1995", an event stop date 282 of "Jul. 1, 1995", and an event duration 284 of "Ongoing." Note that, even though the start date 280 is identical to the displayed stop date 284, the duration is defined as Ongoing and thus reoccurrs indefinitely. In the present example, the variable TIED is TRUE. Thus, as shown in FIG. 17, when a user selects a new event start date 280' of "Aug. 1, 1995", a new event stop date 282' of "Aug. 1, 1995" is created, the event duration 284 does not change, and the modified event parameters are displayed.

With attention focused on FIG. 18, a method 600 for adjusting an event stop date 282 in accordance with yet another method of the present invention will be described. The method 600 is suitable for implementing some embodiments of step 512 of FIG. 14. An initial step 602 tracks a user's input which is intended to modify the event stop date 282. Thus step 502 would monitor the user's button selection with the stylus 110 and determine if the input was just navigational input (and perform the requested navigation) or an actual date selection. Then, based upon the interpretation of the event adjustment input, a step 504 will derive a new stop date 282'. Accordingly, a step 506 will display the new stop time 282'.

Figure 18:
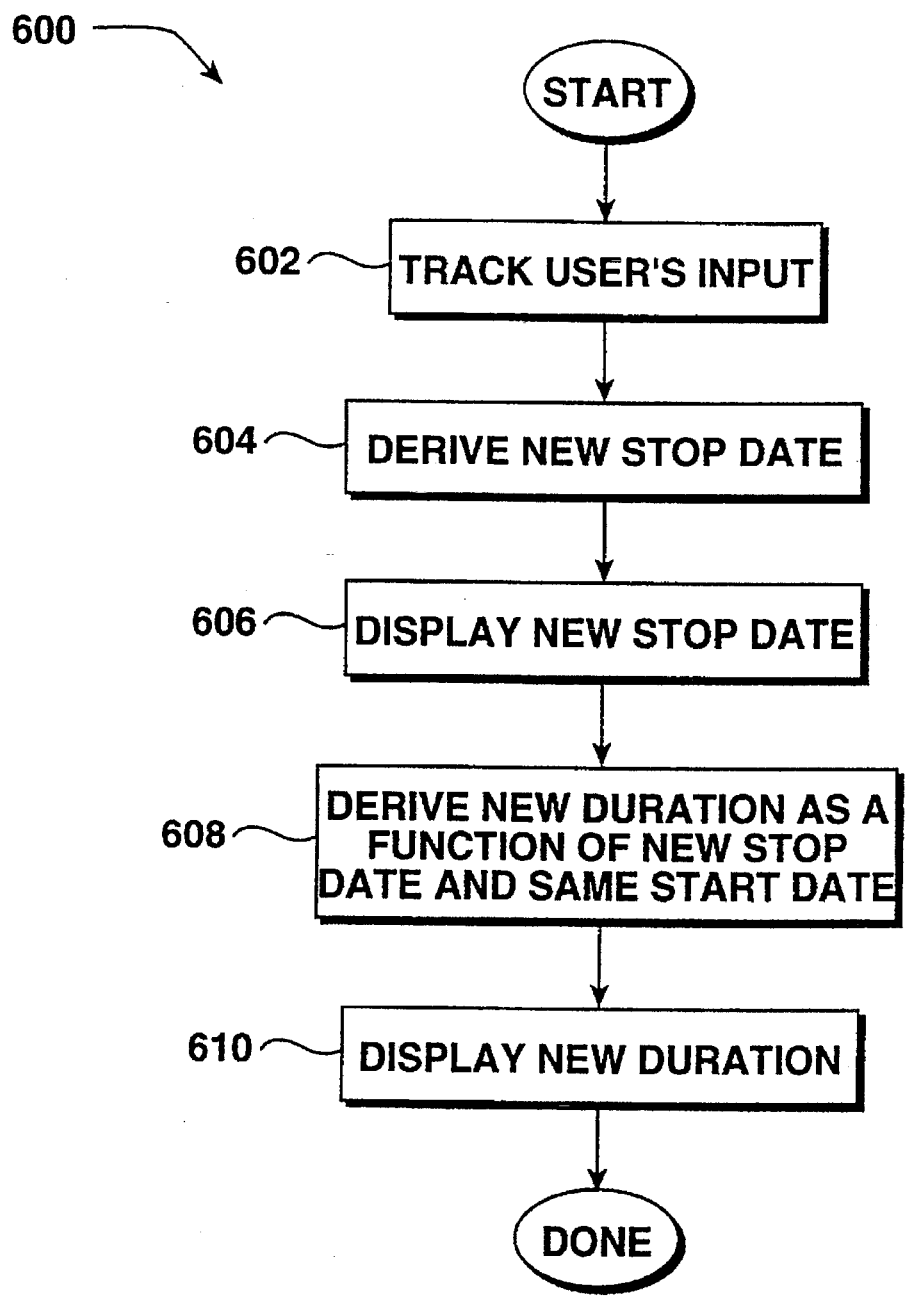
FIG. 18 is a flow chart illustrating one suitable embodiment of step 512 of FIG. 14.

In the embodiment of FIG. 18, the interdependence of the event start date 280 and the event stop date 282 is in only a single direction. That is, the stop date 282 adjusts with variations of the start date 280, but the converse is not true. Therefore, the variable TIED does not need to be evaluated at this juncture. Accordingly, a step 508 derives a new event duration 284' and the method 600 does not modify the original start date 280. A step 510 then displays the new event duration 284' and the method 600 is complete.

Figures 19, 21:
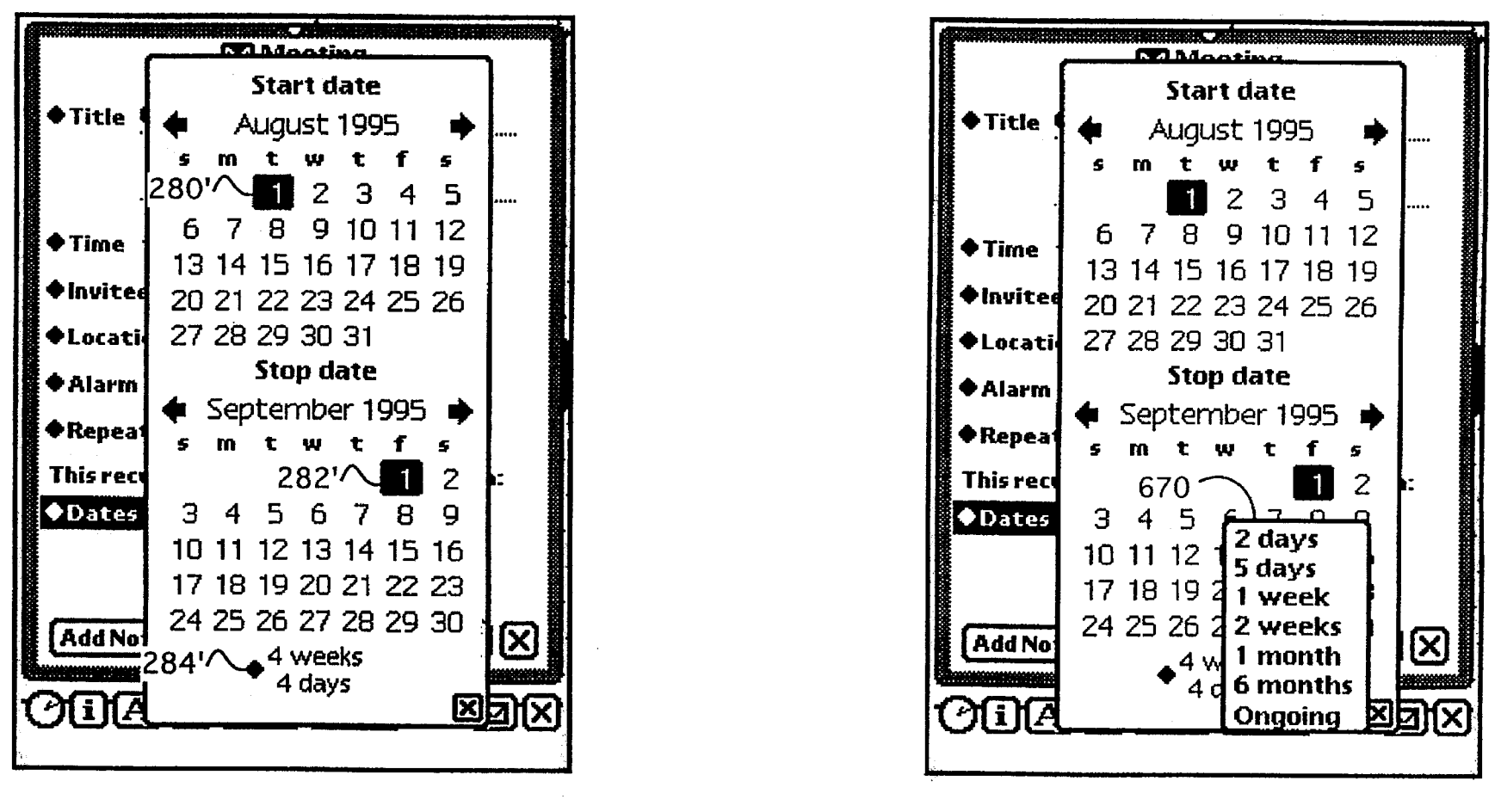

With reference to both FIGS. 15 and 19, an example of modifying an event stop date 282 in accordance with one embodiment of the present invention will now be described. FIG. 19 shows a new event stop date 282' of "Sept. 1, 1995" which the user selected over the previous event stop date 282 of "Aug. 1, 1995" which was displayed in FIG. 15. In accordance with the method 600 of FIG. 18, a new event duration 284' having a value of "4 weeks, 4 days" was derived from the new event stop date 282' and the original event start date 280.

Figure 20:
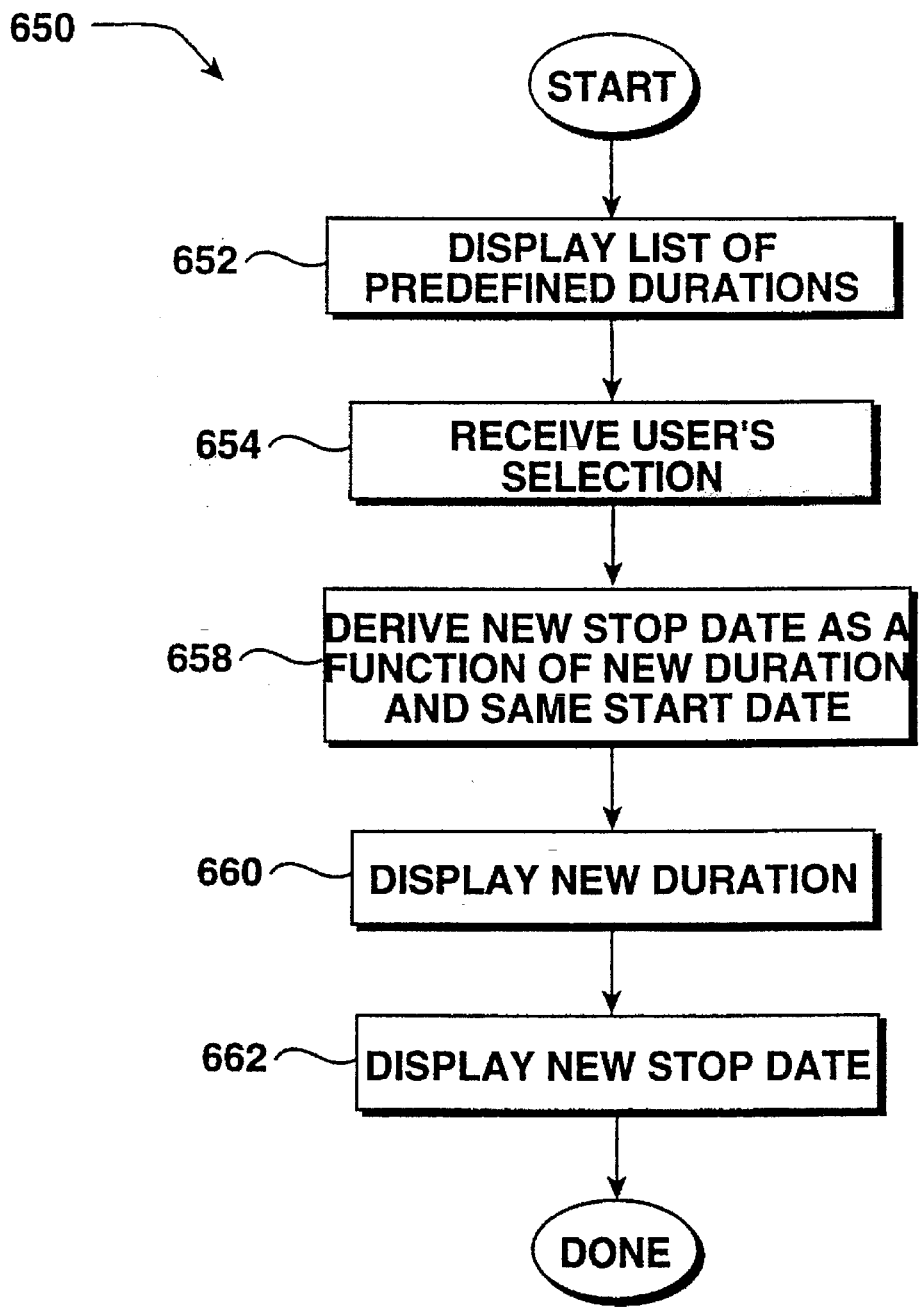
FIG. 20 is a flow chart illustrating one suitable embodiment of step 514 of FIG. 14.

Focusing attention on both FIGS. 20 and 21, a method 650 for adjusting an event duration 284 in accordance with still another embodiment of the present invention will be described. As discussed above, an event duration pop-up menu 670 may be invoked by selecting the displayed event duration 284. In response, a step 652 will display a list of predefined durations. In other embodiments, the pop-up menu 670 may automatically display in response to an appropriate action such as displaying a date picker event adjustment window 520. FIG. 21 illustrates one suitable embodiment of a duration pop-up menu 670. The duration pop-up menu 670 includes the duration periods of "2 days", "5 days", "1 week", "2 weeks", "1 month", "6 months", and "Ongoing." As will be appreciated, a variety of appropriate duration periods may be included into the pop-up menu 670.

A next step 654 receives the user's selection from the pop-up menu 670. Once the user has selected a new event duration 284', a step 658 derives a new event stop date 282' as a function of the new event duration 284' and the original event start date 280. Then, steps 660 and 662 display the new event duration 284' and the new event stop date 282' (in any order or simultaneously).

While this invention has been described in terms of several preferred embodiments, there are alterations, permutations, and equivalents which fall within the scope of this invention. It should also be noted that there are may alternative ways of implementing the processes of the present invention. For example, much of the programming can be simplified by using the high-level utilities and data structures mentioned in the preceding specification. In particular, the described frame database system is preferred for simplifying the programming tasks required by the computer implemented processes of the present invention, but there are many other database and graphics systems which can be used to accomplish the same task.

It is therefore intended that the following appended claims be interpreted as including all such alterations, permutations, and equivalents as fall within the true spirit and scope of the present invention.

What is claimed is:

1. A computer implemented method for adjusting a bounds of an event, the bounds of the event defined by event parameters including an event start boundary, an event stop boundary, and an event duration, wherein the event start boundary and the event stop boundary may be tied to one another such that an event parameter interdependence exists, the method comprising the computer controlled steps of:

displaying an event adjustment window showing the event start boundary, the event stop boundary, and the event duration;

receiving an event adjustment input explicitly intended to modify a selected event parameter being a one of the event start boundary, the event stop boundary, and the event duration, whereby each non-selected event parameter may be implicitly intended to be modified;

modifying the selected event parameter in accordance with the event adjustment input;

modifying each non-selected parameter in accordance with the event parameter interdependence; and displaying the event adjustment window showing the event start boundary, the event stop boundary, and the event duration as modified.

2. A computer implemented method as recited in claim 1 wherein when the event adjustment input is intended to modify the event start boundary, the step of modifying the selected event parameter includes the sub-step of deriving a new event start boundary based on the event adjustment input and the step of modifying each non-selected parameter in accordance with the event parameter includes the sub-steps of:

when the event stop boundary is tied to the event start boundary, deriving a new event stop boundary as a function of the new start time and the event duration; and when the event stop boundary is not tied to the event start boundary, deriving a new event duration as a function of the new start time and the event stop boundary.

3. A computer implemented method as recited in claim 1 wherein when the event adjustment input is intended to modify the event stop boundary, the step of modifying the selected event parameter includes the sub-step of deriving a new event stop boundary based on the event adjustment input and the step of modifying each non-selected parameter includes the sub-step of deriving a new event duration as a function of the new event stop duration and the event boundary.

4. A computer implemented method as recited in claim 1 wherein when the event adjustment input is intended to modify the event duration, the step of modifying the selected parameter includes the sub-steps of:

displaying a list of predefined event durations;

receiving a selection of a one of the predefined event durations; and setting a new event duration equal to the selected predefined event duration.

5. A computer implemented method as recited in claim 4 wherein the step of modifying each of the non-selected parameters includes the substep of deriving a new stop boundary as a function of the event start boundary and the new event duration.

6. A computer implemented method as recited in claim 1 wherein the event start boundary is an event start time, the event stop boundary is an event stop time, and the event duration is a well defined time period.

7. A computer implemented method as recited in claim 6 wherein the event adjustment window is a time picker event adjustment window having descriptive labels identifying both the event start time and the event stop time, and a close request button operable to close the time picker event adjustment window.

8. A computer implemented method as recited in claim 7 wherein the event adjustment input is entered via a stylus tapping a one of the event parameters.

9. A computer implemented method as recited in claim 1 wherein the event start boundary is an event start date, the event stop boundary is an event stop date, and the event duration is a well defined period of time during which the event reoccurs.

10. A computer implemented method as recited in claim 9 wherein the event adjustment window is a date picker event adjustment window having descriptive labels identifying the event start date and the event stop date, and a close request button operable to close the date picker event adjustment window.

11. A computer implemented method as recited in claim 10 wherein the date picker event adjustment window has a start date calendar displaying a month containing the event start date and a stop date calendar displaying a month containing the event stop date.

12. A computer implemented method as recited in claim 11 wherein the date picker event adjustment window further includes navigation buttons operative to navigate through the start date calendar and the stop date calendar.

13. An event bounds adjustment system for adjusting a bounds of an event, the bounds of the event defined by event parameters including an event start boundary, an event stop boundary, and an event duration, wherein the event start boundary and the event stop boundary may be tied to one another such that an event parameter interdependence exists, the event bounds adjustment system comprising:

a pen-based computer system including a central processing unit, memory accessible by the central processing unit, and a dual-function display system having a display screen;

an event bounds adjuster implemented on the pen-based computer system, the event bounds adjuster being operative to display an event adjustment window showing the event start boundary, the event stop boundary, and the event duration, receive an event adjustment input explicitly intended to modify a selected event parameter being a one of the event start boundary, the event stop boundary, and the event duration, modify the selected event parameter in accordance with the event adjustment input, modify each non-selected parameter in accordance with the event parameter interdependence, and display the event adjustment window showing the event start boundary, the event stop boundary, and the event duration as modified.

14. A graphical user interface comprising:

a pen-based computer system including a central processing unit, a memory accessible by the central processing unit, and a dual-function display system having a display screen;

a pen for use in entering data into the pen-based computer system via the dual-function display system;

an event scheduler display window having a multiple hour time block, a calendar, and an identified event;

an event slip corresponding to the identified event including a title field, a time field having an event start time and an event stop date, and a date field having an event start date and an event stop date;

a time picker event adjustment window having descriptive labels identifying both the event start time and the event stop time, and a close request button operable to close the time picker event adjustment window; and a date picker event adjustment window having descriptive labels identifying the event start date and the event stop date, and a close request button operable to close the date picker event adjustment window, wherein tapping on the identified event with the pen invokes the event slip, tapping on the time field invokes the time picker event adjustment window, and tapping on the date field invokes the date picker event window.

15. A graphical user interface as recited in claim 14 wherein the date picker event adjustment window further includes a start date calendar displaying a month containing the event start date and a stop date calendar displaying a month containing the event stop date.

16. A graphical user interface as recited in claim 15 wherein the date picker event adjustment window further includes navigation buttons operative to navigate through the start date calendar and the stop date calendar.

17. A computer readable medium containing a computer program for adjusting a bounds of an event, the bounds of the event defined by event parameters including an event start boundary, an event stop boundary, and an event duration, wherein the event start boundary and the event stop boundary may be tied to one another such that an event parameter interdependence exists, the computer program including computer instructions for:

displaying an event adjustment window showing the event start boundary, the event stop boundary, and the event duration.;

receiving an event adjustment input explicitly intended to modify a selected event parameter being a one of the event start boundary, the event stop boundary, and the event duration, whereby each non-selected event parameter may be implicitly intended to be modified;

modifying the selected event parameter in accordance with the event adjustment input;

modifying each non-selected parameter in accordance with the event parameter interdependence; and displaying the event adjustment window showing the event start boundary, the event stop boundary, and the event duration as modified.

18. A computer readable medium as recited in claim 17 wherein when the event adjustment input is intended to modify the event duration, the computer instruction for modifying the selected parameter includes executing the following instructions:

displaying a list of predefined event durations;

receiving a selection of a one of the predefined event durations; and setting a new event duration equal to the selected predefined event duration.

19. A computer readable medium as recited in claim 18 wherein the computer instruction for modifying each of the non-selected parameters includes executing the instruction of deriving a new stop boundary as a function of the event start boundary and the new event duration.

20. A computer readable medium as recited in claim 17 wherein the event start boundary is an event start time, the event stop boundary is an event stop time, and the event duration is a well defined time period.

* * * * *